(12) United States Patent
Saha

(10) Patent No.: US 10,539,813 B2
(45) Date of Patent: Jan. 21, 2020

(54) DEFORMABLE PHOTOELASTIC DEVICE

(71) Applicant: Pamela Saha, Brooklyn, NY (US)

(72) Inventor: Pamela Saha, Brooklyn, NY (US)

( * ) Notice: Subject to any disclaimer, the term of this patent is extended or adjusted under 35 U.S.C. 154(b) by 493 days.

(21) Appl. No.: 14/828,463

(22) Filed: Aug. 17, 2015

(65) Prior Publication Data
US 2016/0048040 A1 Feb. 18, 2016

Related U.S. Application Data

(63) Continuation-in-part of application No. 12/316,238, filed on Dec. 10, 2008, now Pat. No. 9,109,882, which is a continuation-in-part of application No. 10/765,115, filed on Jan. 28, 2004, now Pat. No. 7,477,389.

(51) Int. Cl.
| | | |
|---|---|---|
| G02F 1/00 | (2006.01) | |
| G02B 27/00 | (2006.01) | |
| G02F 1/01 | (2006.01) | |
| G02B 27/42 | (2006.01) | |
| G02B 27/08 | (2006.01) | |
| G02B 5/30 | (2006.01) | |
| G02B 1/04 | (2006.01) | |
| A63H 33/22 | (2006.01) | |
| G01L 1/24 | (2006.01) | |

(52) U.S. Cl.
CPC .......... *G02F 1/0131* (2013.01); *A63H 33/22* (2013.01); *G01L 1/241* (2013.01); *G02B 1/04* (2013.01); *G02B 5/3033* (2013.01); *G02B 27/08* (2013.01); *G02B 27/42* (2013.01)

(58) Field of Classification Search
None
See application file for complete search history.

(56) References Cited

U.S. PATENT DOCUMENTS

| | | | | |
|---|---|---|---|---|
| 133,229 | A * | 11/1872 | Hyatt et al. | ......... B29C 47/0004 |
| | | | | 106/169.29 |
| 2,070,787 | A | 2/1937 | Frocht | |
| 2,120,365 | A | 6/1938 | Kriebel | |
| 2,423,371 | A | 7/1947 | Carranza | |
| 2,473,857 | A * | 6/1949 | Fford | ...................... 359/486.03 |
| 2,786,292 | A * | 3/1957 | Graves | .................. G02B 27/08 |
| | | | | 359/489.19 |
| 3,034,344 | A | 5/1962 | Zandman | |

(Continued)

OTHER PUBLICATIONS

Photon/Photon2 Explorations in Optics, New England Board of Higher Education, Jul. 2013.*

(Continued)

*Primary Examiner* — Kara E. Geisel
*Assistant Examiner* — Jarreas C Underwood
(74) *Attorney, Agent, or Firm* — Symbus Law Group, LLC; Clifford D. Hyra

(57) ABSTRACT

A sky kaleidoscope system includes a polarizing film, a first plastic plate having a first transparent design, and a second plastic plate having a second transparent design. The polarizing film is sandwiched between the first plastic plate and the second plastic plate. The first and second transparent designs are photoelastic and/or light diffracting. The sky kaleidoscope may be held up to the sky and the plastic plates and polarizing film may be looked through to view resulting rainbow colors in the first or second transparent design.

25 Claims, 23 Drawing Sheets

(56) References Cited

U.S. PATENT DOCUMENTS

| | | | |
|---|---|---|---|
| 3,034,395 A * | 5/1962 | Zandman | G01L 1/241 |
| | | | 356/34 |
| 3,052,153 A | 9/1962 | Powell | |
| 3,071,502 A | 1/1963 | Zandman | |
| 3,100,418 A * | 8/1963 | Posner | G09F 19/18 |
| | | | 353/20 |
| 3,187,623 A | 6/1965 | Zandman | |
| 3,313,204 A | 4/1967 | Oppel | |
| 3,313,205 A | 4/1967 | Roberts | |
| 3,315,391 A * | 4/1967 | Lane | B29C 51/10 |
| | | | 359/489.15 |
| 3,331,236 A | 7/1967 | Payne | |
| 3,373,652 A * | 3/1968 | Flader | G01B 11/18 |
| | | | 356/33 |
| 3,407,530 A | 10/1968 | Grant | |
| 3,520,752 A * | 7/1970 | Dreyer | B44C 1/1733 |
| | | | 156/234 |
| 3,535,805 A | 10/1970 | Peiperl | |
| 3,581,431 A | 6/1971 | Trenovan | |
| 3,651,584 A | 3/1972 | Perry | |
| 3,665,669 A | 5/1972 | Huber | |
| 3,674,333 A * | 7/1972 | Mandel | G02B 27/08 |
| | | | 359/617 |
| 3,698,795 A * | 10/1972 | Flint | G02B 5/1814 |
| | | | 359/571 |
| 3,842,202 A * | 10/1974 | Coale | H01J 29/89 |
| | | | 348/833 |
| 3,883,988 A | 5/1975 | Fields | |
| 3,891,179 A * | 6/1975 | Berman | B28B 7/34 |
| | | | 249/134 |
| 3,927,461 A | 12/1975 | Peiperl | |
| 3,966,326 A * | 6/1976 | Brull | A61B 5/1174 |
| | | | 356/35 |
| 3,972,319 A * | 8/1976 | Dehlinger | A61B 3/04 |
| | | | 600/27 |
| 4,008,960 A | 2/1977 | Reytblatt | |
| 4,259,808 A | 4/1981 | Oakes | |
| 4,264,154 A * | 4/1981 | Petersen | G03B 9/32 |
| | | | 351/49 |
| 4,508,526 A * | 4/1985 | Dutcher | G02C 5/2272 |
| | | | 156/108 |
| 4,523,848 A | 6/1985 | Gorman | |
| 4,526,818 A * | 7/1985 | Hoshikawa | G02F 1/133305 |
| | | | 156/106 |
| H76 H * | 7/1986 | Cotterman | 356/33 |
| 4,651,871 A | 3/1987 | Schroter | |
| 4,668,085 A | 5/1987 | Pitt | |
| 4,710,760 A | 12/1987 | Kasday | |
| 5,029,954 A | 7/1991 | Eilrich | |
| 5,089,903 A * | 2/1992 | Kuwayama | G02B 27/0103 |
| | | | 359/15 |
| 5,172,270 A | 12/1992 | Peiperl | |
| 5,300,764 A * | 4/1994 | Hoshino | B42D 25/328 |
| | | | 235/457 |
| 5,327,180 A | 7/1994 | Hester | |
| 5,411,398 A | 5/1995 | Nakashini | |
| 5,466,564 A | 11/1995 | Blazey | |
| 5,810,640 A | 9/1998 | Clarke | |
| 5,962,572 A | 10/1999 | Chen | |
| 5,999,317 A | 12/1999 | Whitney | |
| 6,118,586 A * | 9/2000 | Tanabe | G02B 5/1833 |
| | | | 349/201 |
| 6,141,149 A | 10/2000 | Carlson | |
| 6,219,139 B1 | 4/2001 | Lesniak | |
| 6,421,131 B1 * | 7/2002 | Miller | G01J 3/447 |
| | | | 356/453 |
| 6,599,334 B1 | 7/2003 | Anderson | |
| 6,650,405 B2 | 11/2003 | Lam | |
| 6,679,828 B2 | 1/2004 | Kaufman | |
| 6,944,983 B1 | 9/2005 | Rasmussen | |
| 6,984,038 B2 * | 1/2006 | Ishak | G02C 7/10 |
| | | | 351/159.62 |
| 6,985,214 B2 * | 1/2006 | Szaroletta | G01B 11/18 |
| | | | 356/34 |
| 7,430,038 B2 * | 9/2008 | Szaroletta | G01B 11/18 |
| | | | 356/32 |
| 7,477,386 B2 | 1/2009 | Saha | |
| 7,477,389 B2 | 1/2009 | Saha | |
| 8,187,681 B2 * | 5/2012 | Nakayama | C08J 5/18 |
| | | | 428/1.33 |
| 9,041,924 B2 * | 5/2015 | Amako | G01J 3/18 |
| | | | 356/328 |
| 2003/0067593 A1 | 4/2003 | Szaroletta | |
| 2003/0178609 A1 | 9/2003 | Hammond-Smith | |
| 2008/0252972 A1 * | 10/2008 | Chida | B32B 27/08 |
| | | | 359/485.01 |
| 2012/0077152 A1 * | 3/2012 | Saha | G09B 11/00 |
| | | | 434/81 |
| 2012/0289119 A1 * | 11/2012 | Comarow | A63H 33/22 |
| | | | 446/219 |
| 2014/0268030 A1 * | 9/2014 | Castacane | G02C 7/165 |
| | | | 351/159.52 |

OTHER PUBLICATIONS

Material Safety Data Sheet for Product: PL3 (MSDS#MGP555/6D) dated Jun. 26, 2000; Measurements Group Inc. pp. 1-6.
Material Safety Data Sheet for Product: PLH-2/PLH-3 (MSDS#MGP552D) dated Jun. 26, 2000; Measurements Group Inc. pp. 1-5.
Frocht, M.M.: Photoelasticity; vol. 1; John Wiley & Sons, Inc. New York 1941; pp. 198, 238, 248, 250, 251, 254, 282, 296, 336-348, 371.
Smith & Cooper; Elements of Physics; Ninth Edition; McGraw-Hill Book Co.; pp. 363, 369-370.
Serway et al.; Physics for Scientists and Engineers with Modern Physics; Fifth Edition; Saunders College Publishing; p. 372.
Instructions for Mixing Type PL-3 Liquid Plastic; Instruction Bulletin IB-235-2; Measurements Group, Inc; 1982; Two pages unnumbered.
Instructions for Casting and Contouring PhotoStress Sheet; Application Note IB-221-D; Vishay Micro-Measurements; Revised Jan. 2003; pp. 1-10.
Instructions for Bonding Flat and Contoured PhotoStress Sheets; Application Note IB-223-H, Vishay Micro-Measurements; Revised Jan. 2003 pp. 1-10.
How to Select Photoelastic Coatings; Tech Note TN-704-1, Vishay Measurements Group; 1978; pp. 1-7.
Instructions for Brushing PhotoStress Coatings on Test Part Surfaces; Instruction Bulletin IB-239-1; Vishay Measurements Group, Revised May 2002; Two Pages.
Photoelastic Materials; Bulletin S-116-H; Vishay Measurements Group; 1992; pp. 2, 4, 5, 7.

* cited by examiner

DEFORMABLE PHOTOELASTIC DEVICE

This application is a continuation-in-part of U.S. application Ser. No. 12/316,238 filed Dec. 10, 2008 which is a continuation-in-part of U.S. application Ser. No. 10/765,115, filed Jan. 28, 2004, which are hereby incorporated by reference in their entirety.

BACKGROUND OF THE INVENTION

Photoelasticity is a property of certain materials that is used for stress analysis of materials in the fields of scientific measurement and mechanical engineering. Prior methods of using photoelasticity involve measurements of stress distribution within structures.

Needs exist for toys and entertainment devices that amuse as well as to stimulate an interest in science and engineering in children and adults.

SUMMARY OF THE INVENTION

The present invention is a toy, art object, decoration, ornament, entertainment device, advertising device, paperweight or other device made of a deformable plastic material in shapes of prisms, lenses, wedges, cubes, pyramids, as well as other forms that display the changing stress patterns formed by deformations of the photoelastic material. The toy may have one or more magnets embedded within the photoelastic plastic material. Magnets or other devices apply force on the material, deform it, and create fringes generated by the resultant stress pattern. The viewing effects increase the entertainment and aesthetic value of the devices.

A preferred device has a deformable transparent form made of polyurethane or made of a polymer resin placed between two light polarizing films. As light is shown through the object, fringes appear in the object and may be projected on a screen.

Generally, the photoelastic material is a transparent solid. However, the degree of transparency or opacity may vary to enhance the visual characteristics and create different effects in different molded objects. A single object may have regions that are transparent, some regions that are opaque and some regions that are translucent or any combination thereof.

The photoelastic material has characteristics that vary within the same item or from item to item. The chemical makeup of the plastic may vary as long as the plastic is photoelastic. The photoelastic material may also vary in its modulus of elasticity to create variable optical characteristics when stressed. The photoelastic material may be clear or colored. Additionally, color may be varied from one object to another or color can be varied within the same item. Areas of a single photoelastic object can be blue, another red, a third yellow, etc.

The shapes of the toy may be geometric shapes, flexible sheets, prisms, lenses, wedges, cubes, pyramids, amorphous forms, animal or dinosaur shapes as well as other forms that display the changing stress patterns formed by deformations of the photoelastic material. The forms are made in a variety of collectable shapes that create interesting stress patterns.

Magnets may be embedded within photoelastic objects to apply forces for creating fringe patterns. The magnets either molded into the photoelastic object. The magnets either attract or repel the other magnets, forming new and changeable fringe patterns. The magnets may also cause the individual forms to attract and repel each other.

The magnets vary in placement, number of magnets per object, size, magnetic strength, shape and chemical makeup. The magnetic poles of the magnets can be arranged to create different optical effects. The magnets themselves may have a glossy finish to add effects caused by reflection of light.

The plastic shape and embedded magnets can be formed to exploit other possible optical effects. For example, prism shapes, lens shapes, wedge effects from the interface between the magnet surface and the material presents an additional optical effect to entertain the user.

A polarizing film within, or covering the clear plastic of the entertainment device enhances the viewing effects. One or more polarizing films may be attached to one or more outer surfaces of the photoelastic material.

Alternatively, if the shapes do not have a polarizing film attached, the photoelastic plastic shapes can be manipulated between two films separated and supported by four posts disposed between the films. Two polarizing films may also be mounted on separate stands to allow more flexibility in viewing the optical effects.

Other options exist for viewing the photoelastic properties of the present invention. A polarized light source may be used. Light from the polarized light source passes through a photoelastic object, through a pair of polarized glasses and into the viewer's eyes. Alternatively, light from an unpolarized light source may pass through a polarizing film, through a photoelastic object and through a pair of polarized glasses before reaching the viewer. Two polaroid films may be used to view the photoelastic object. The polaroid films are rotated with respect to one another to increase or decrease the amount of light passing through the photoelastic object.

Another embodiment of the photoelastic entertainment device involves forming the photoelastic material into a rope. When stretching forces are applied to the rope, the forces create fringes that correlate to the amount of force applied.

Other optical effects may be incorporated into the present invention to enhance the viewing experience of the user. Bubbles or colloidal particles may be dispersed within the molded object. These particles affect the fringe patterns. Similarly, discontinuities, such as cavities, notches and/or curvatures may be introduced to accentuate the fringe patterns through stress concentration. These and other stress concentration techniques may also be employed to increase fringe patterns or to create specific patterns and designs, such as faces, flowers, etc. A thin air interface between embedded magnets or other objects and the photoelastic material produces interference patterns of light. The surfaces of the embedded objects may be shiny or opaque. This in turn causes visual effects due to reflection or refraction of light.

Other optical effects may be employed in any embodiment of the present invention. This includes porosity of the photoelastic material, colloidal effects and other optical effects including reflection, magnification, diffraction, and interference patterns of light. Additionally, the shape of the photoelastic object may be formed to have the effect of a prism.

Mirrored or other reflective surfaces may be used to enhance optical effects. An opaque object or a mirrored surface may be placed below or embedded within the transparent or translucent photoelastic material. An example of an embedded mirrored surface is an embedded magnet with a glossy surface. The magnet will create fringe patterns when brought near other magnets and through the glossy, mirrored surface. The opaque object or mirrored surface may also be a characteristic of the photoelastic object itself.

A photoelastic material may be manipulated between a separate mirrored surface and a polarized film.

The photoelastic entertainment device of the present invention may have an applied photoelastic coating. The applied photoelastic coating is a liquid paint coating or a flexible sheet coating that covers the object. Polarizing films are applied on a surface of the photoelastic material or mounted separately from the photoelastic material. When multiple polarizing films are rotated with respect to one another, the transmission of light is controlled.

Manipulation of stress levels affects stress patterns. External forces, such as manual manipulation and/or one or more of the following: springs, strings, elastic bands, clamps, embedded and/or externally placed magnets and other devices may also be used to create interesting optical effects. Additionally, any combination of devices may be used to create stress patterns. A photoelastic object may be molded with an internal cavity. Another object, with a larger diameter than the internal cavity, is inserted into the cavity. This causes stretching of the larger photoelastic object and creates fringe patterns. Sharp objects may also be used to create fringe patterns.

Fixed, permanent fringes may be created within the photoelastic objects through curing techniques and permanent deformation strategies.

A separate lens may be used to more easily view the visual effects. A lens may be embedded within the photoelastic object as well. Transparent or translucent protective coatings are applied over outer surfaces of the photoelastic material.

The purpose of the invention is to amuse as well as to stimulate an interest in science and engineering in children and adults.

A new photoelastic entertainment device includes photoelastic material molded into shapes and one or more light polarizing films for viewing fringe patterns within the photoelastic materials caused by stress. In one embodiment, one or more of the shapes are animal part shapes or shapes with holes or impressions shaped like animal parts. The animal parts may be teeth, claws, tusks, ears, eyes, noses, lips, hands, feet, toes, fingers, nails, hair, feathers, talons, wings, fins, beaks, flippers, or faces. In another embodiment, one or more of the shapes are animal product shapes or shapes with holes or impressions shaped like animal products. The animal products may be spider webs, ant hills, bee hives, birds' nests, eggs, tear drops, sea or snail shells, or waste products. In another embodiment, one or more of the shapes are organ shapes or shapes with holes or impressions shaped like one or more organs. The organs may be bones, hearts, brains, skulls, livers, lungs, or stomachs.

In another embodiment, one or more of the shapes are celestial object shapes or shapes with holes or impressions shaped like one or more celestial objects. The celestial objects may be planets, shooting stars, comets, sun or moon, or stars. The celestial objects may be stars. In another embodiment, one or more of the shapes are Holiday decoration or ornament shapes or shapes with holes or impressions shaped like one or more Holiday decorations or ornaments. The Holiday decorations or ornaments may be Easter baskets or bunnies, masks, jackolanterns, candles, Santa Clauses, halos, candy canes, menorahs, or valentine hearts. In another embodiment, one or more of the shapes are household item shapes in miniature or normal size or shapes with holes or impressions shaped like one or more household items in miniature or normal size. The household items may be hangers, knives, spoons, forks, plates, clothes, glasses, hats, cups, brooms, bottles, baby items, furniture, table clothes, writing pens or pencils, telephones, tooth brushes, combs, hair brushes, clocks, windows, or shoes. The household items may be tablecloths, clothing, luggage, shoes, wallets, buttons, jewelry, frames, chairs, tables, bar stands, bottles, paper weights, pens, pencils, letter openers, boxes, trophies, containers, storage devices, furniture, cloths, placemats, calendars, cups, saucers, plates, utensils, CD, DVD, video and record covers or containers, knobs, artificial flowers and plants, vases, or toothbrushes.

In another embodiment, one or more of the shapes are tool shapes in miniature or normal size or shapes with holes or impressions shaped like one or more tools in miniature or normal size. The tools may be springs, nails, hammers, saws, wrenches, screw drivers, or drills. In another embodiment, one or more of the shapes are transportation object shapes or shapes with holes or impressions shaped like one or more transportation objects. The transportation objects may be air planes, trains, bicycles, cars, scooters, or trucks. In another embodiment, one or more of the shapes are musical instrument shapes or shapes with holes or impressions shaped like one or more musical instruments. The musical instruments may be horns, string instruments, flutes, pianos, or drums. In another embodiment, one or more of the shapes are sword shapes or shapes with holes or impressions shaped like one or more swords.

In another embodiment, one or more of the shapes are sports object shapes or shapes with holes or impressions shaped like one or more sports objects. The sports objects may be rackets, darts, clubs, swimming gear, footballs, or golf clubs. The sports objects may be boxing glove or punching bag coverings, trampoline parts, bicycles, skates, punching bags, balls, discs, boomerangs, hoops, kites, jump ropes, bouncing objects, bats, rackets, paddles, or targets. In another embodiment, one or more of the shapes are deformed with holes or impressions, in such a way as to create patterns of photoelastic fringes recognizable as repeating or familiar patterns. The repeating or familiar patterns may be faces or a series of stars, triangles, or flowers. The repeating or familiar patterns may be faces or flowers.

In another embodiment, one or more of the shapes are shapes of one or more named characters, creatures or items pertaining to a work or works of fiction or shapes with holes or impressions shaped like one or more named characters, creatures or items pertaining to a work or works of fiction. In another embodiment, one or more of the shapes are spiritual symbol shapes or shapes with holes or impressions shaped like spiritual symbols. The spiritual symbols may be crosses, I-Chings, Zodiacs, Halos, Trees of life, Ankhs, Elven Stars, Angelic and Satanic symbols, Caducei, Celtic knots, yin-yangs, or peace signs. In another embodiment, one or more of the shapes are shapes of direction signs, punctuation marks, letters of the English alphabet or another language or numbers or shapes with holes or impressions shaped like direction signs, punctuation marks, letters of the English alphabet or another language or numbers. The punctuation marks may be question marks, exclamation points, periods, quotes, ampersands, at signs, dollar signs, percent signs, complete words, number signs, asterisks, commas, colons, or apostrophes.

In another embodiment, one or more of the shapes are food shapes or shapes with holes or impressions shaped like food. The food may be sandwiches, ice cream, cones, lollipops, candies, or fruits. In another embodiment, one or more of the shapes are historic buildings or monuments shapes or shapes with holes or impressions shaped like historic buildings or monuments. The historic buildings or monuments may be the Taj Mahal, Pyramids, the Sphinx, the Statue of Liberty, the White House, the Pentagon, the Washington Monument, the Leaning Tower of Pisa, or the United States Capital.

In another embodiment, one or more of the shapes are houses, log cabins, teepees, or igloos or shapes with holes or impressions shaped like houses, log cabins, teepees, or igloos. In another embodiment, one or more of the shapes are money, stamps, or flags or shapes with holes or impressions shaped like money, stamps, or flags. In another embodiment, one or more of the shapes are medical equipment or shapes with holes or impressions shaped like medical equipment. The medical equipment may be stethoscopes, otoscopes, ophthalmoscopes, or reflex hammers. In another embodiment, one or more of the shapes are rainbows, clouds, snowflakes, fire, sparks, lightning, fireworks, or flames or shapes with holes or impressions shaped like rainbows, clouds, snowflakes, fire, sparks, lightning, fireworks, or flames.

In one embodiment, one or more of the light polarizing films are mounted on separate stands. In this embodiment, there may also be polarizing glasses and the light polarizing films mounted on separate stands may be oriented with respect to the polarizing glasses for optimal blockage of transmitted light in viewing photoelastic objects. The separate stands may be paper or cardboard frames and each of the paper or cardboard frames may be cut from a single piece of paper or cardboard and folded so that it stands on its own with fanciful designs on the paper or cardboard frames to enhance their value as a toy. The separate stands may be paper or cardboard frames and each of the paper or cardboard frames may include two separate pieces, one folded into a stand part, the other holding the polarizing film and mounted in the stand part, with fanciful designs on the paper or cardboard frames to enhance their value as a toy.

One or more of the light polarizing films may be mounted in a cardboard or plastic stand, mounted by hanging, or mounted with suction cups or another device to a window. One or more of the light polarizing films may be mounted so that they can be rotated to regulate the transmission of light with respect to polarizing glasses, another free standing polarizing film, or a reflective surface.

The photoelastic entertainment device may also include a shatter proof reflective surface, with one or more of the light polarizing films lining the reflective surface. It may include a reflective surface for viewing photoelastic fringes in plastics, for example using Brewster's angle. This reflective surface may be shatter proof black plastic or cardboard.

The photoelastic material may be a deformable photoelastic device or a preformed photoelastic object.

These and further and other objects and features of the invention are apparent in the disclosure, which includes the above and ongoing written specification, with the drawings.

DETAILED DESCRIPTION OF THE PREFERRED EMBODIMENTS

The present invention is a toy made of a soft deformable photoelastic plastic material. The toy may have one or more magnets embedded within the photoelastic plastic material. Magnets or other devices apply force on the material, deform it, and create fringes generated by the resultant stress pattern.

Figure 1:
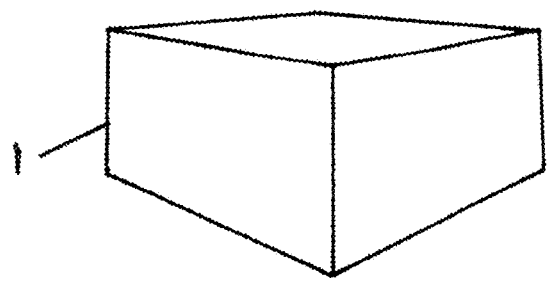
FIG. 1 is a perspective view of a molded photoelastic object with a geometric shape.

FIG. 1 shows a geometric shaped photoelastic object 1. Generally, the photoelastic material is a transparent solid. However, the degree of transparency or opacity may vary to enhance the visual characteristics and create different effects in different molded objects. A single object may have regions that are transparent, some regions that are opaque and some regions that are translucent or any combination thereof.

The photoelastic material has characteristics that vary within the same item or from item to item. The chemical makeup of the plastic may vary as long as the plastic is photoelastic. The photoelastic material may also vary in its modulus of elasticity to create variable optical characteristics when stressed. The photoelastic material may be clear or colored. Additionally, color may be varied from one object to another or color can be varied within the same item. Areas of a single photoelastic object can be blue, another red, a third yellow, etc.

Figure 2:
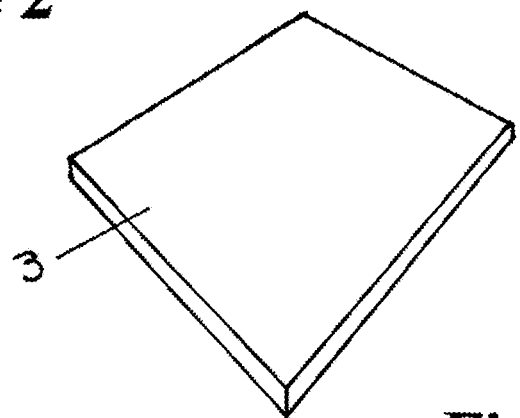
FIG. 2 is a perspective view of a sheet of photoelastic material.
Figure 3:
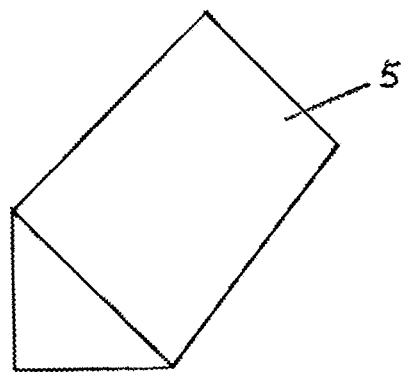
FIG. 3 is a perspective view of a photoelastic object molded into the shape of a prism.
Figure 4:
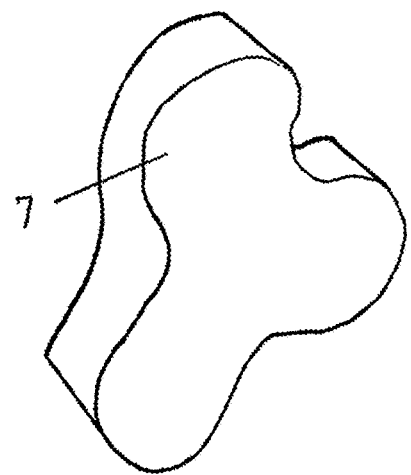
FIG. 4 is a perspective view of an amorphous shaped photoelastic object.

The photoelastic object 1 is molded into various shapes and sizes. FIG. 2 shows a photoelastic object 3 molded into a thin pliable sheet. FIG. 3 shows a photoelastic object 5 molded into the shape of a prism. FIG. 4 shows a photoelastic object molded into an amorphous shape 7. The shapes of the toys may also be spheres, stars, lenses, wedges, cubes, pyramids, springs, as well as other forms that display the changing stress patterns formed by deformations of the photoelastic material. The forms are made in a variety of collectable shapes that create visually interesting stress patterns. Additionally, objects can be molded into animal shapes or dinosaur shapes to appeal to children.

Figure 5:
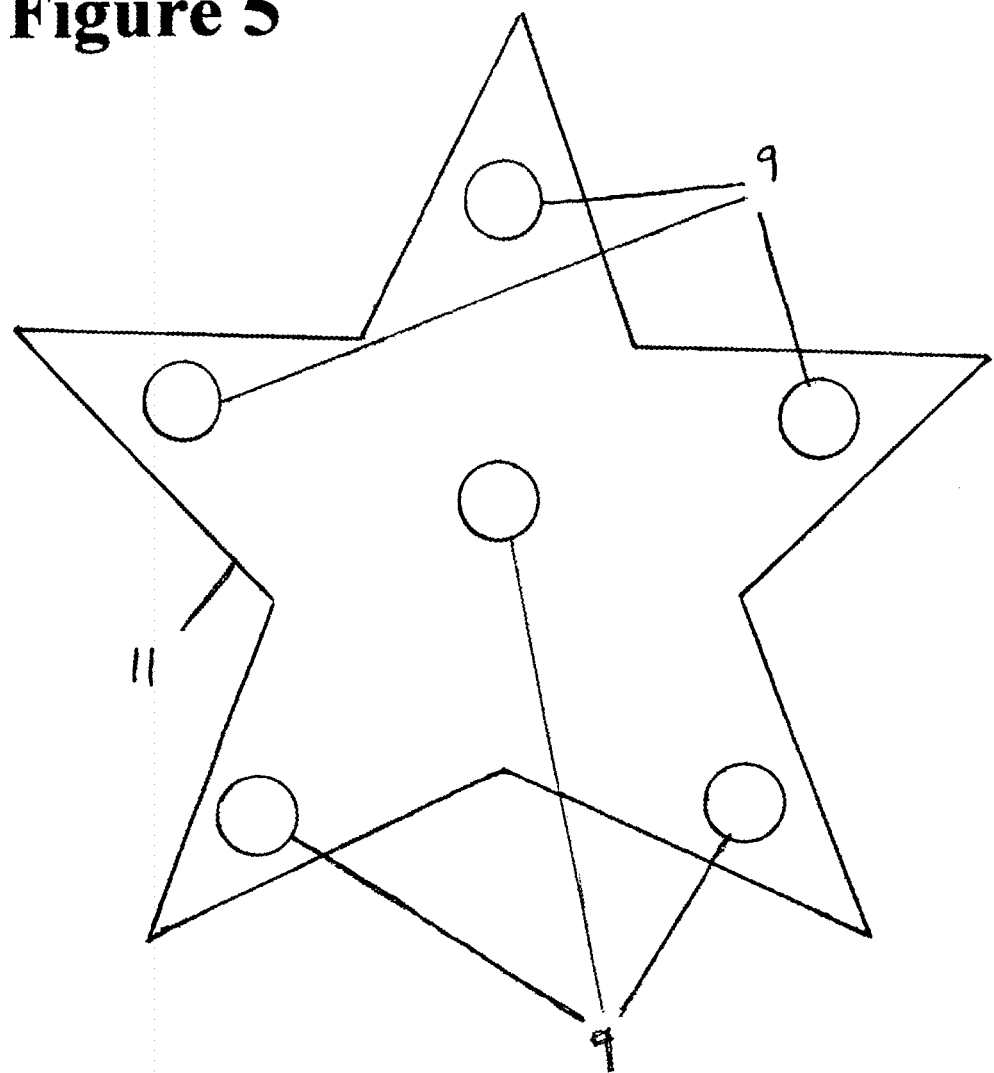
FIG. 5 is a star shaped photoelastic object with embedded magnets.

FIG. 5 shows magnets 9 embedded within photoelastic material 11 to apply forces for creating new fringe patterns. The magnets 9 are molded into the photoelastic object 11. The magnets 9 either attract or repel the other magnets 9, forming new and changeable fringe patterns. The magnets 9 may also cause the individual forms to attract and repel each other.

The magnets 9 vary in placement, number of magnets 9 per object 11, size, magnetic strength, shape and chemical makeup. The magnetic poles of the magnets 9 can be arranged to create different optical effects.

The plastic shapes 11 and embedded magnets 9 can be formed to exploit other possible optical effects. For example, prism shapes, lens shapes, wedge effects from the interface between the magnet surface 9 and the material 11 presents an additional optical effect to entertain the user.

Figure 6:
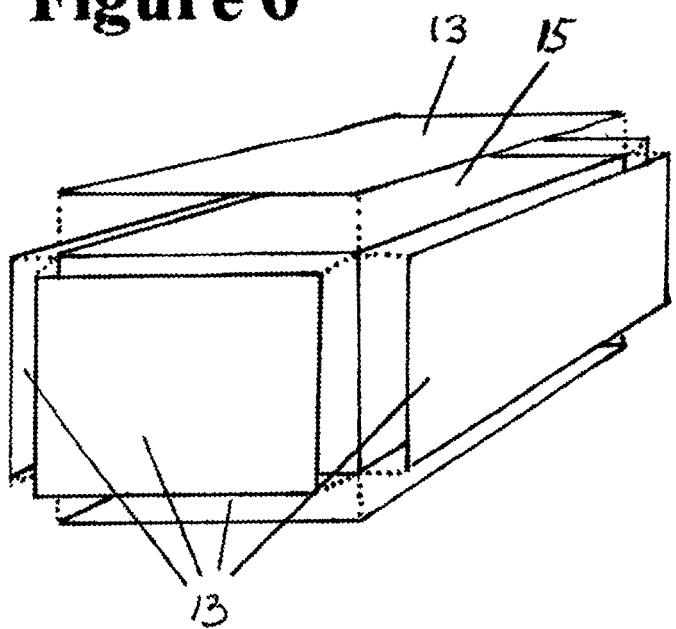
FIG. 6 is a perspective view of a photoelastic object with polarizing films covering each surface.

FIG. 6 shows a polarizing film 13 covering a molded photoelastic plastic object 15. One or more polarizing films 13 are attached to one or more sides of a molded photoelastic object 15. The polarizing film 13 allows the user to view the fringe effects.

Figure 7:
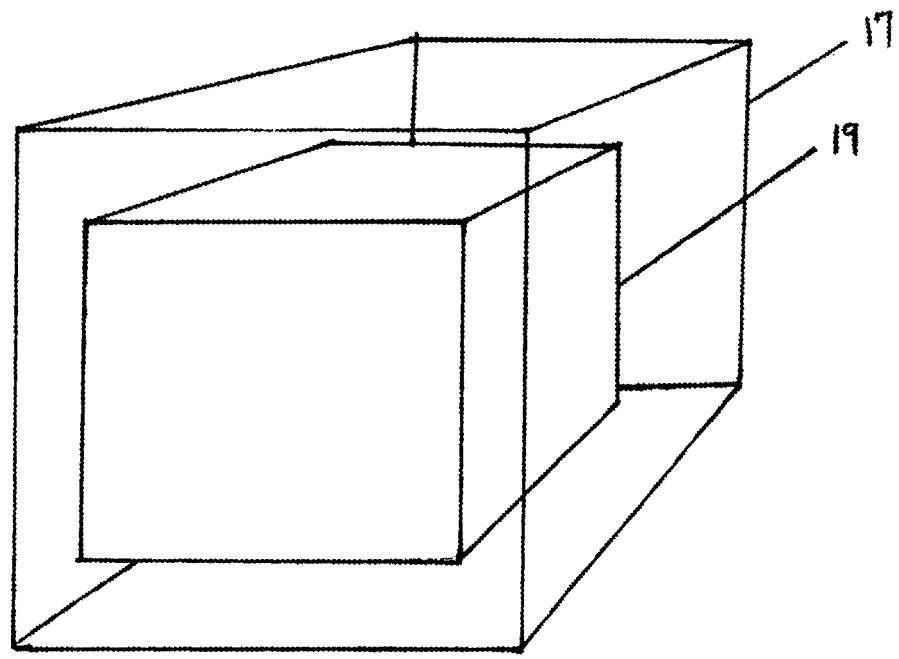
FIG. 7 is a perspective view of a photoelastic object with polarizing films molded into the object.

FIG. 7 shows a molded photoelastic object 17 with a polarizing film 19 embedded within the object 17. The object 17 is transparent. The film 19 and the object 17 may have any shape or configuration. Varying the shapes creates different visual effects.

Figure 8:
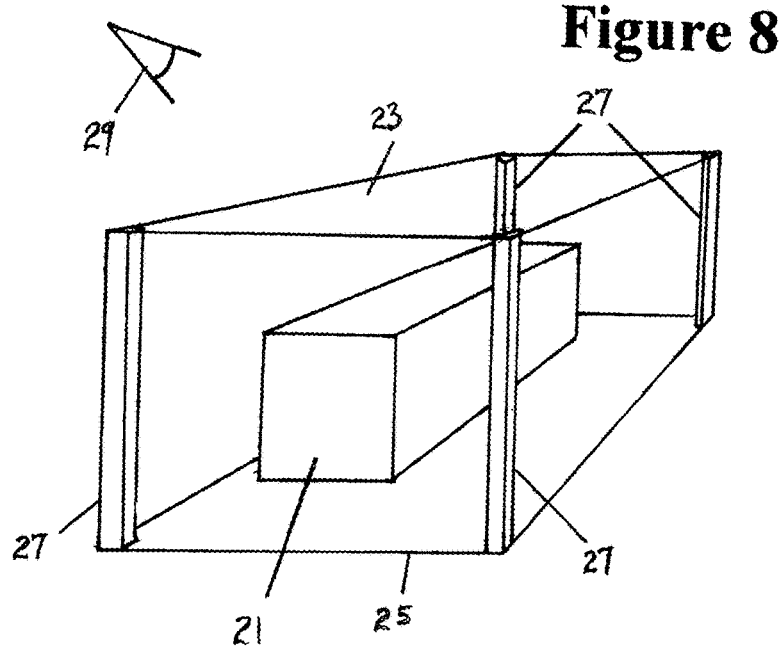
FIG. 8 is a perspective view of a molded photoelastic object between two sheets of polarizing film separated by posts.

FIG. 8 shows a photoelastic object 21 between two sheets 23, 25 of polarizing film. If the shapes 21 do not have a polarizing film attached, the plastic shapes 21 can be manipulated between two films 23, 25 to show fringe effects. The films 23, 25 are separated and supported by four posts 27 disposed between the films 23, 25. The posts 27 are located at the corners of the roughly rectangular sheets 23, 25. The sheets 23, 25 are spaced to allow a user to manually manipulate the object 21 while it is held between the sheets 23, 25. The observer 29 views the object 21 through the first polarizing film 23. Light reaches the viewer 29 through one film 25, through the object 21, and then through the other film 23.

Figure 9:
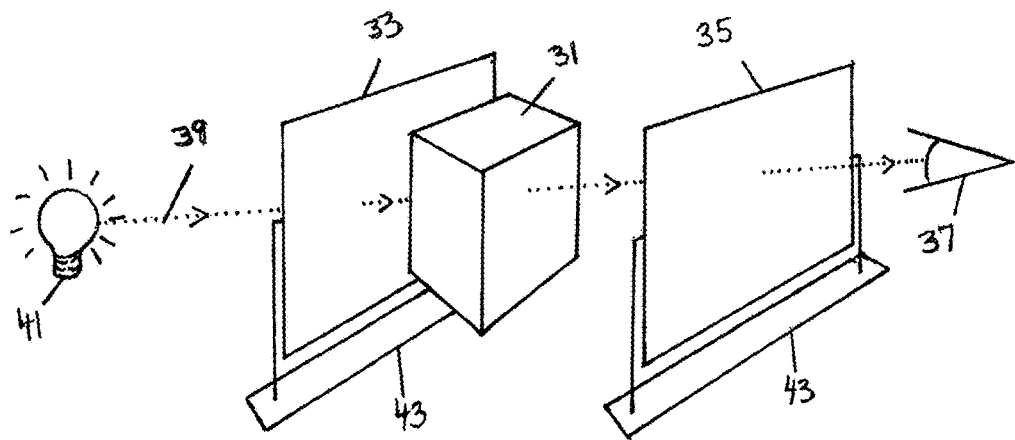
FIG. 9 shows a photoelastic object between two movable polarizing films.

FIG. 9 shows a photoelastic object 31 between two separate sheets 33, 35 of polarizing film. If the shapes 31 do not have a polarizing film attached, the plastic shapes 31 are manipulated between two films 33, 35 to show fringe effects. A viewer 37 observes light 39 from a light source 41 that passes through a first polarizing film 33, the object 31 and a second polarizing film 35. Each polarizing film 33, 35 may have a stand 43 for placing the films 33, 35 in various positions. This frees up the user's hands to manipulate the object 31. The films 33, 35 are placed in different relative positions to create different visual effects.

Figure 10:
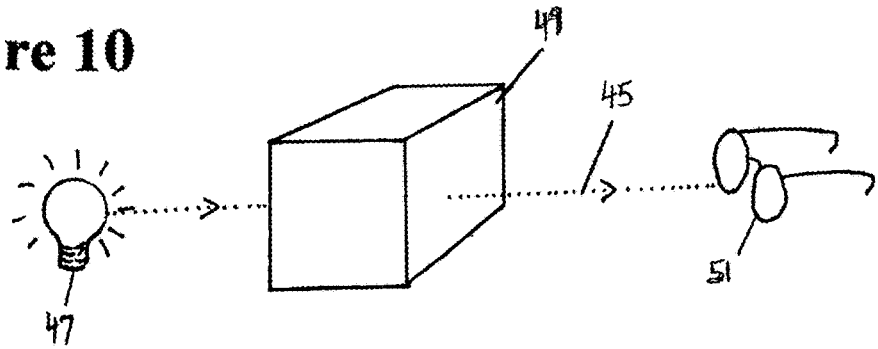
FIG. 10 shows a light source projecting light through a toy having polarizing films on opposite sides and projecting the patterns onto a screen.

FIG. 10 shows polarized light 45 from a polarized light source 47 passing through a photoelastic object 49. The polarized light 45 then passes through a pair of polarized glasses 51 worn by a user. In this embodiment, the photoelastic object 49 does not have any attached polarizing films. The polarized light source 47 and polarized glasses 51 provide the means to view the resulting fringe patterns. A polarized film may be attached directly to the light source 47.

Figure 11:
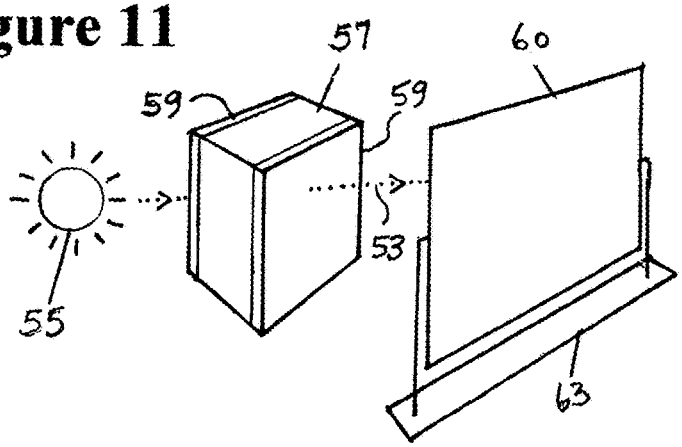
FIG. 11 shows a light source projecting light through a toy having polarizing films on opposite sides and projecting the patterns onto a screen.

FIG. 11 shows another embodiment of the present invention. In this embodiment, light 53 from the sun or another unpolarized light source 55 passes through a first light polarizing film 59. The light 53 then passes through a photoelastic object 57 and then through a second polarizing film 59. Polarizing films are applied directly to the photoelastic object 57. A screen 60 may be mounted on a stand 63 to free the hands of the user to manipulate the photoelastic object 57. Placing stresses on the object in various configurations changes the fringes shown on the screen.

Figure 12:
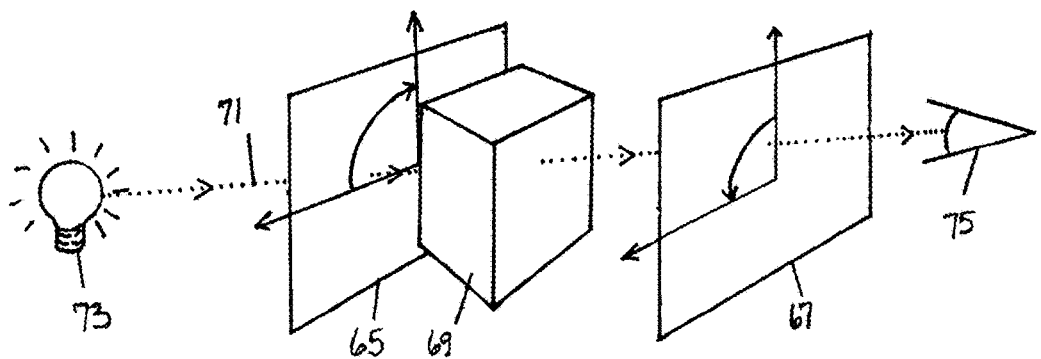
FIG. 12 shows a photoelastic object between two polarizing films that are rotated to produce varying visual effects.

FIG. 12 shows the use of polaroids 65, 67 with a photoelastic object 69. Light 71 travels from a light source 73 through a first polaroid 65. The first polaroid 65 is rotated in relation to the light source 73. The light 71 then passes through the photoelastic object 69 and onto the second polaroid 67. This polaroid 67 is also rotated in relation to the first polaroid 65, reducing light transmission. The remaining light 71 then passes through the second polaroid 67 and into the eye 75 of the viewer. The polaroids 65, 67 may be placed on the surface of the photoelastic object 69. The placement of the polaroids 65, 67 on the surface of the photoelastic material 69 or on separate mounts may be varied in order to vary the amount of light 71 transmitted.

Figure 13:
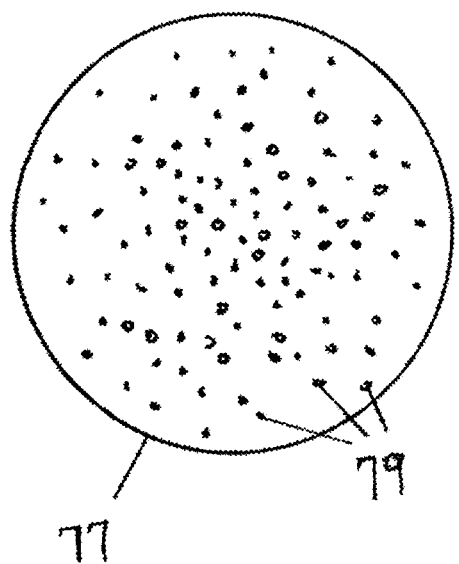
FIG. 13 shows a photoelastic object with colloidal particles dispersed within the object.
Figure 14:
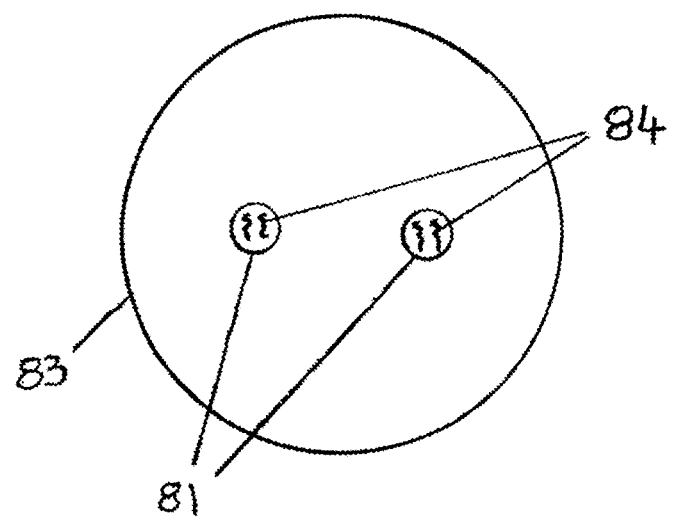
FIG. 14 shows a photoelastic object with a thin air interface within the object.

Other optical effects may be incorporated into the present invention to enhance the viewing experience of the user. FIG. 13 shows a photoelastic object 77 with bubbles or colloidal particles 79 dispersed within the molded object 77. These particles 79 affect the fringe patterns. FIG. 14 shows magnets 81 or other objects embedded within a molded photoelastic object 83. A thin air interface 84 between the embedded objects 81 and the photoelastic material 83 produces interference patterns of light. The surface of the embedded objects 81 may be shiny or opaque. This in turn causes visual effects due to reflection or refraction or light.

Other optical effects may be employed in any embodiment of the present invention. This includes porosity of the photoelastic material, colloidal effects and other optical effects including magnification, reflection, diffraction, and interference patterns of light. Additionally, the shape of the photoelastic object may be formed to have the effect of a prism.

Manipulation of stress levels affects stress patterns. External forces, such as manual manipulation, springs, strings, elastic bands, clamps, embedded and/or externally placed magnets and other devices may also be used to create interesting optical effects.

Figure 15:
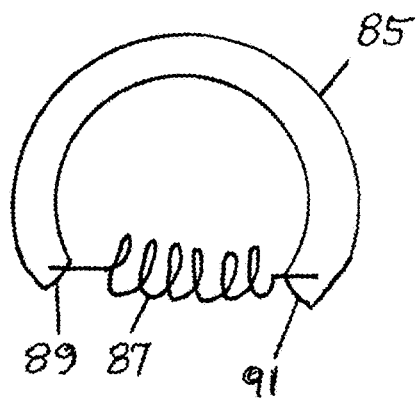
FIG. 15 shows a photoelastic object with a spring between opposite ends for creating optical effects.

FIG. 15 shows an elongated photoelastic object 85 with a spring 87 connected between opposite ends 89, 91 of the object 85. The spring 87 may have different tensions and different tensions may be combined with objects 85 of varying modulus of elasticity. Each change creates a new and unique fringe pattern in the photoelastic object 85.

Figure 16:
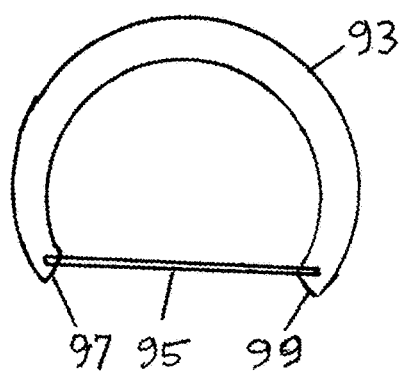
FIG. 16 shows a photoelastic object with a string or elastic band between opposite ends for creating optical effects.

FIG. 16 shows an elongated photoelastic object 93 with a string or elastic band 95 between opposite ends 97, 99 of the object 93. The string or elastic band 95 creates stress within the photoelectric object 93. The stress then creates fringe patterns that are viewable to the user.

Figure 17:
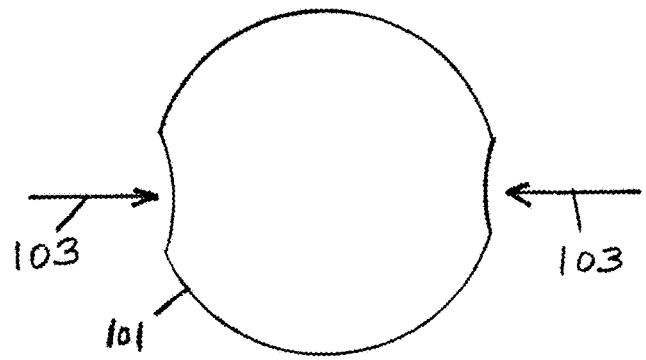
FIG. 17 shows a photoelastic object being compressed on opposite sides for creating optical effects.

FIG. 17 shows a photoelastic object 101 being deformed by external stress 103. External stresses can be applied in a variety of positions and combinations to create different patterns.

Figure 18:
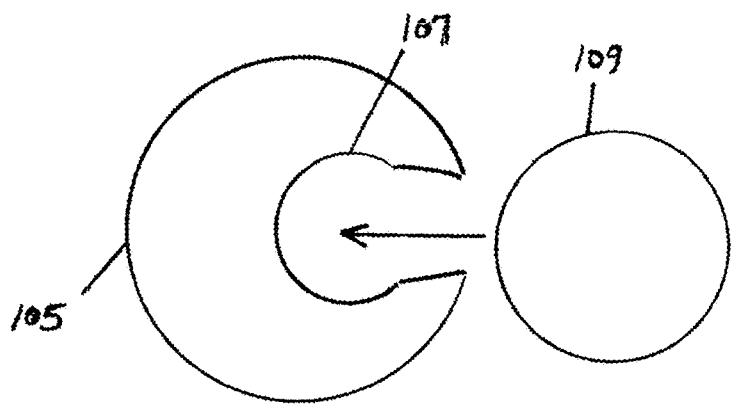
FIG. 18 shows a photoelastic object with an inner opening for receiving an insert that is larger than the opening for creating optical effects.

Another method of inducing stress, shown in FIG. 18, is to create a molded photoelastic object 105 with an interior cavity 107. Another object 109, which may or may not be photoelastic, is inserted into the cavity 107. The second object 109 is larger in dimension than the interior cavity 107. The stretching of the larger photoelastic object 105 creates stresses that are seen in fringe patterns.

Figure 19:
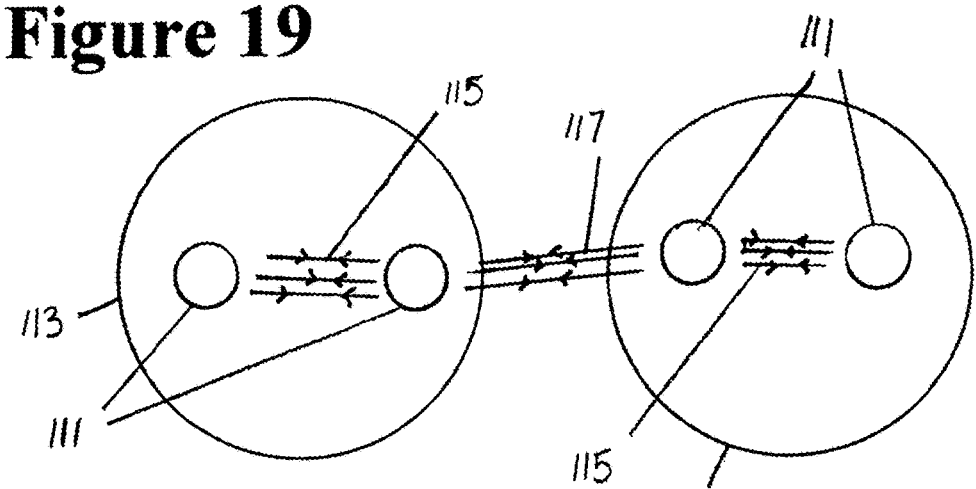
FIG. 19 shows two photoelastic objects with embedded magnets in proximity to one another for creating optical effects.

FIG. 19 shows one or more magnets 111 embedded within a photoelastic object 113 creating stresses. The magnets 111 within the same object attract or repel each other with force 115, deforming the photoelastic object 113. Additionally, more than one photoelastic objects 113 with embedded magnets 111 may be brought near each other. The force 117 between the magnets 111, in different objects 113, creates stresses in both photoelastic objects 113. The force 117 may cause the objects 113 to attract and stick together, causing more fringe patterns in each, or the force 117 may cause the objects 113 to repel each other.

Figure 20:
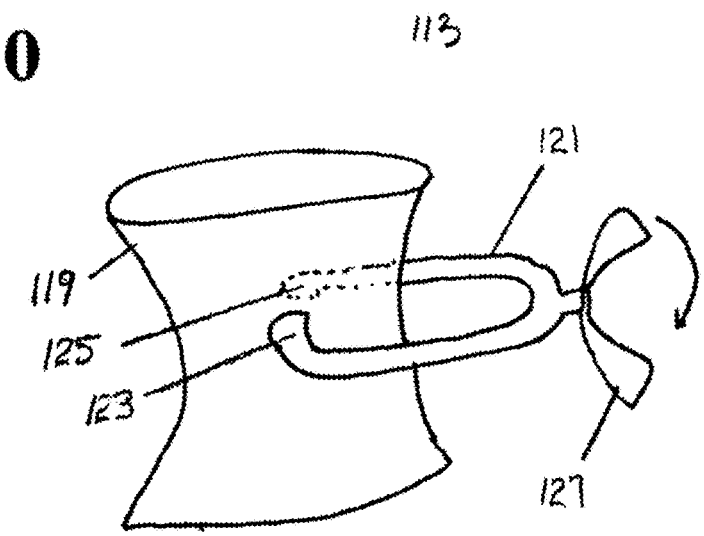
FIG. 20 shows a photoelastic object compressed by a clamp for producing optical effects.

FIG. 20 shows a photoelastic material 119 being deformed by a clamp 121. The photoelastic object 119 is placed between the ends 123, 125 of the clamp 121 and the clamp is tightened by a tightening mechanism 127. As the clamp 121 is tightened, the fringe patterns change as a result of changing stress levels.

Figure 21:
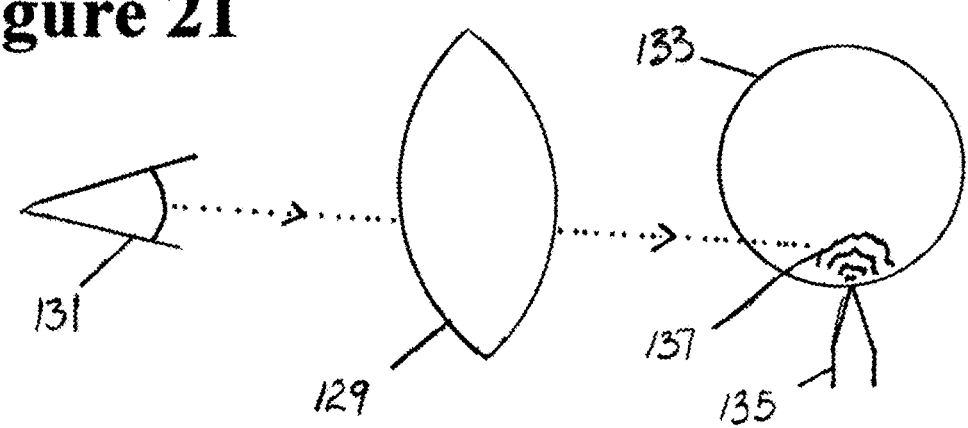
FIG. 21 shows a pointed object containing a photoelastic object for creating optical effects visible through a lens.

FIG. 21 shows that lenses 129 may be separately provided to magnify the optical effects of the present invention. A viewer 131 views a photoelastic object 133 through the lens 129. A sharp object 135 may be used to create fringe patterns 137. One or more sharp objects 135 may be used to create various optical effects.

A photoelastic coating is applied to objects as a liquid to be painted or as a flexible sheet. Fringes may be observed as unpolarized light reflects off a surface of an opaque, coated object or off a mirrored surface beneath a transparent or translucent coated object through a polarizing film or films. The polarizing film or films may be applied on the surface of the coating on the object or mounted separate from the object. The mirrored surface may be separate from the object, embedded in the object, or a characteristic of the object itself. An example of a coated object is a magnet with a glossy finish. Other examples are possible. More than one such object would be able to attract and/or repel other objects. If more than one polarizing film is used, these can be rotated with respect to one another to control the transmission of light.

Figure 22:
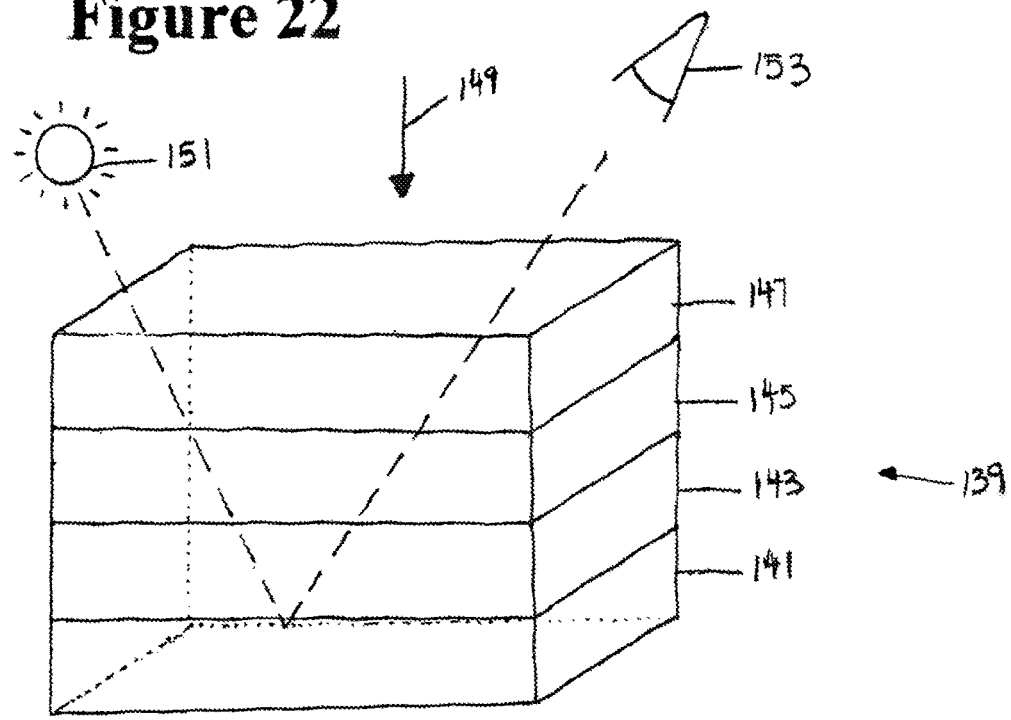
FIG. 22 shows the use of reflection with photoelastic objects.

FIG. 22 shows the use of reflection with photoelastic objects. A photoelastic object 139 is composed of multiple layers. The base layer 141 is a reflective surface, coating or sheet. The next layer 143 is a photoelastic sheet or coating. The next layer 145 is a polarizing film. The final layer 147 in FIG. 22 is a protective transparent coating or sheet. The photoelastic object 139 may be a flexible sheet, such as a tablecloth, clothing, trampoline parts, boxing glove or punching bag coverings, hand bags or other bags, luggage, shoes, wallets, buttons, jewelry, decorations, frames and many other materials. Layering with reflective materials may also be applied to more rigid applications on items such as chairs, tables, bar stands, bottles, paper weights, pens, pencils, letter openers, boxes, business cards, greeting cards, pet items, decorative features on cars, bicycles, skates, tools, and many other uses.

Applied force 149 causes the deformation of the object 139. Examples of applied force 149 include folding, gravity, placement of dishes on a photoelastic tablecloth, persons sitting on photoelastic chairs, punching a photoelastic punching bag or grasping a pen. Unpolarized light 151 can be from a lamp, candle, the sun or even ambient light. The light 151 passes through layers 143, 145, 147 and is reflected off layer 141. Reflected light 151 then passes back through layers 143, 145, 147 and onto the observer 153.

Photoelastic effects can be used to create fixed, permanent fringes within photoelastic objects through curing techniques and permanent deformation strategies. Permanent deformation strategies create fixed stress patterns in photoelastic plastics. Deformation may be permanently fixed into the photoelastic sheet or coating, creating permanently fixed fringes by unequal cooling or applied forces during the formative stages of photoelastic material.

Figure 23:
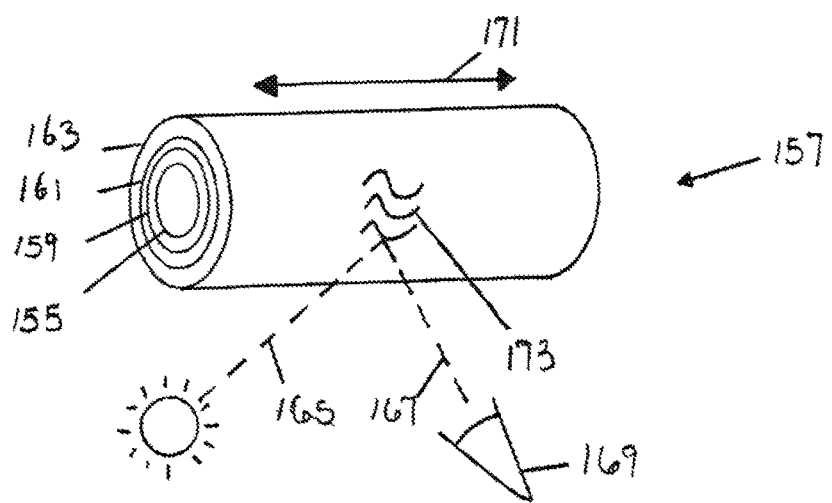
FIGS. 23 and 24 show three-dimensional formulations using reflection.
Figure 24:
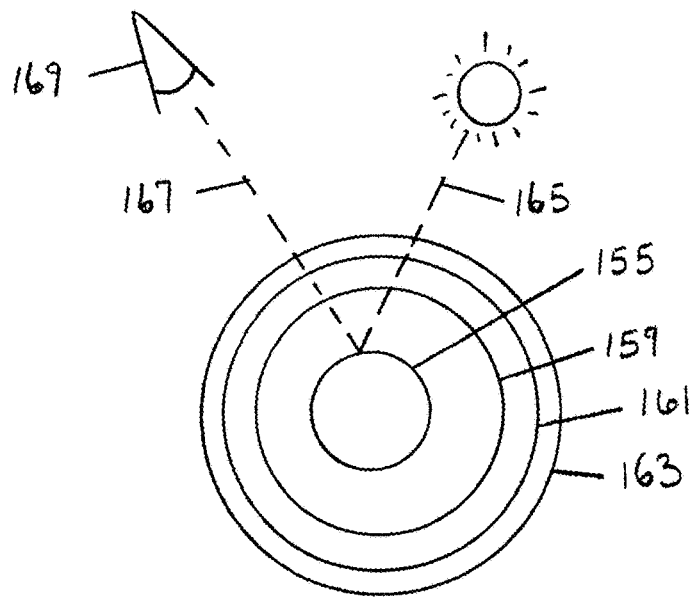

FIGS. 23 and 24 show three-dimensional formulations using reflection. The center 155 of a photoelastic object 157 is made of a reflective surface. A photoelastic layer 159 surrounds the central layer 155. A polarizing film 161 surrounds the photoelastic layer 159, and a protective transparent or translucent layer 163 surrounds the polarizing film 161. Unpolarized light 165 passes through layers 159, 161, 163 and is reflected off layer 155. Reflected light 167 then passes back through layers 159, 161, 163 and onto the observer 169. A force 171 from stretching creates fringe patterns 173.

Photoelastic materials, such as in FIGS. 23 and 24, may be used for ropes. A rope 157 is designed with photoelastic effects such that the number or fringes 173 in a stretched state corresponds to the amount of force applied. This is both a practical and entertaining use of fringe materials. Force measurements are made with the rope 157. Alternatively, the rope 157 may be used for tug-of-war contests or to encourage physical exercise in children and adults.

Additionally, transparent or translucent molded photoelastic objects can be manipulated between a mirror and a polarizing film or films.

Figure 25:
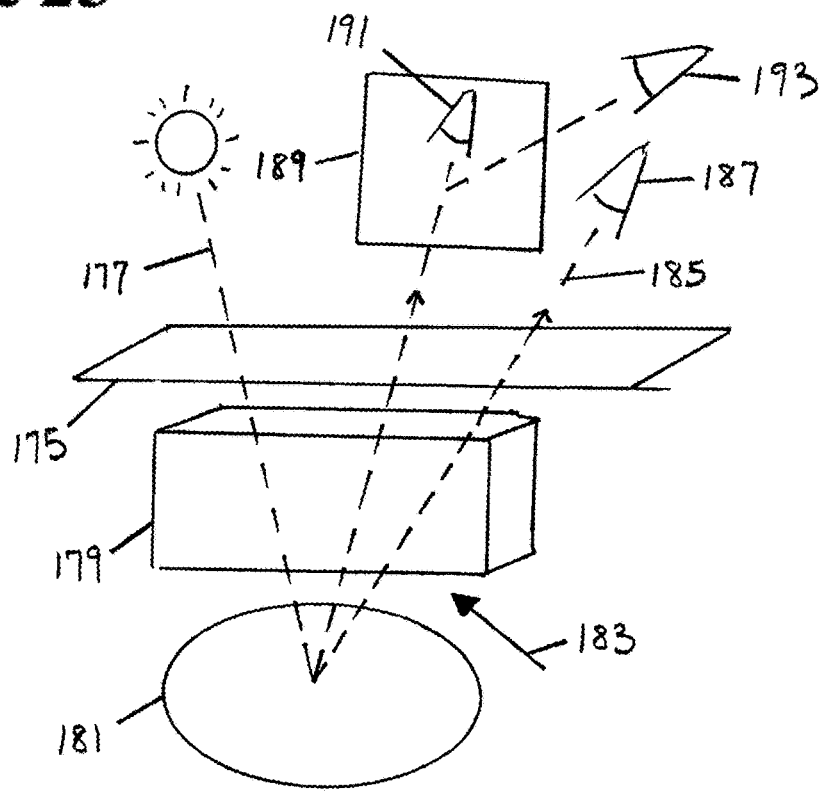
FIG. 25 shows a basic general description of embodiments using reflection.

FIG. 25 shows a basic general description of formulations using reflection. One or more polarizing films 175 are used. If more than one film 175 is used, the films 175 can rotate with respect to one another to control the transmission of light 177. The films 175 may be mounted separately, directly bonded to the surface of a photoelastic object 179, or embedded within the photoelastic object 179. The photoelastic object 179 is translucent or transparent and varies in size, shape, chemical makeup, modulus of elasticity, color, degree of transparency within one object or from object to object. The photoelastic object 179 is placed over a mirrored surface 181. Force 183 is applied to the photoelastic object 179 by magnets, strings, clamps, springs, manual manipulation or other devices. The light 177 passes through the one or more films 175, through the photoelastic object 179, and onto the mirrored surface 181. Reflected light 185 then travels back through the photoelastic object 179, the one or more films 175 and onto the observer 187. Additionally, fringe patterns may be projected onto a screen 189 and viewed by an observer behind the screen 191 or in front of the screen 193.

Figure 26:
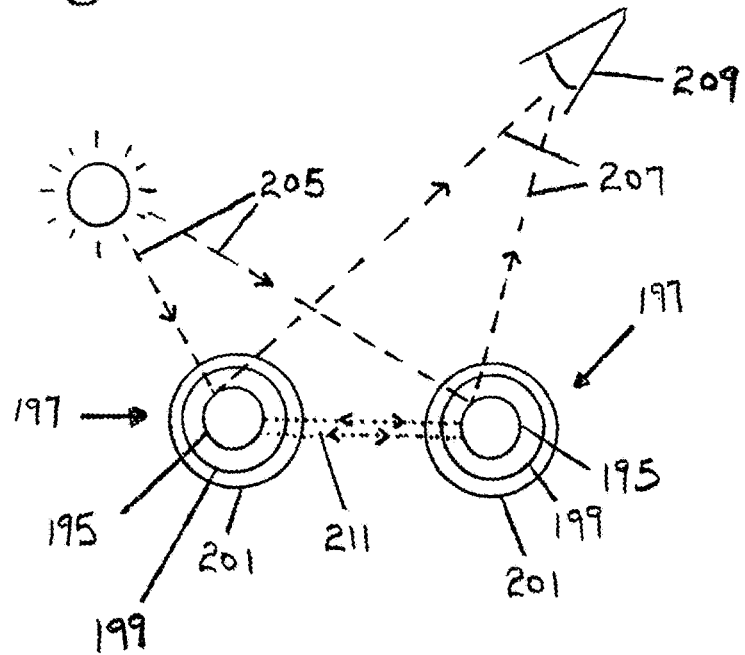
FIG. 26 shows an embodiment of a photoelastic device with embedded magnets and reflections.
Figure 27:
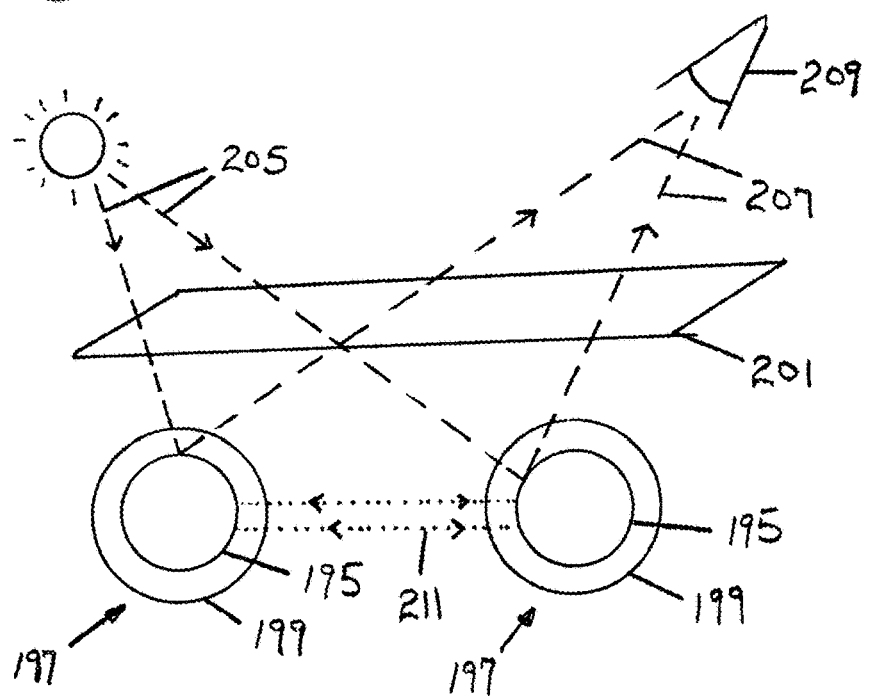
FIG. 27 shows the embedded magnet embodiment of FIG. 26 with the polarizing film not attached to the photoelastic object.

FIGS. 26 and 27 show formulations using reflections and magnets. The centers 195 of photoelastic objects 197 are magnets made with reflective surfaces. Photoelastic layers 199 surround the central layers 195. Polarizing films 201 surround the photoelastic layers 199, and protective transparent or translucent layers may surround the polarizing films 201. Unpolarized light 205 passes through layers 199, 201 and is reflected off layers 195. Reflected light 207 then passes back through layers 199, 201 and onto the observer 209. Magnetic forces 211 either attract or repel and create fringe patterns.

FIG. 27 shows the embedded magnet embodiment of FIG. 26 with the polarizing film 201 not attached to the photoelastic object 197. The polarizing film 201 may be mounted to free the hands of the observer 209. A pair of films 201 may be used to control the transmission of light 205.

Figure 28:
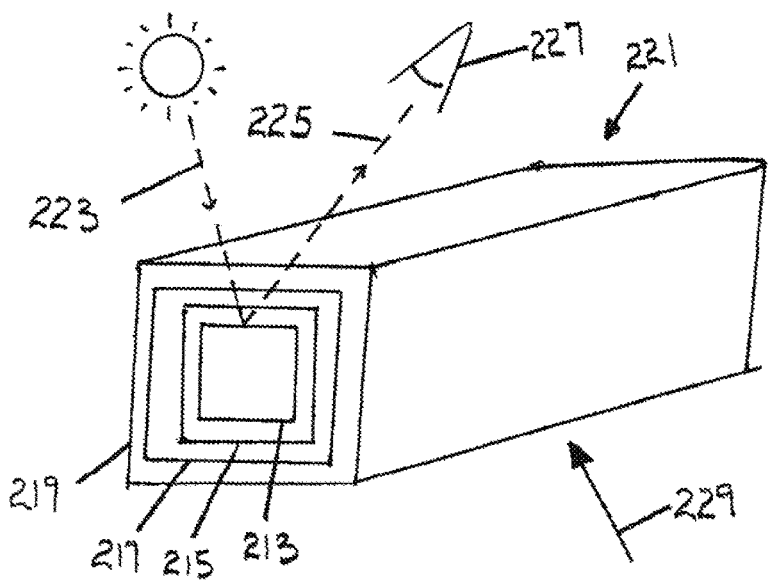
FIG. 28 shows a reflective coating application accessible in three dimensions.

FIG. 28 shows a reflective coating application accessible in three dimensions. A central reflective surface 213 is shaped as a square or rectangle. Photoelastic material 215 covers each side of the reflective surfaces 213. Polarizing films 217 are attached to or embedded within the photoelastic material 215 on all sides. A transparent or translucent protective coating 219 is then applied to all sides of the object 221. Unpolarized light 223 passes through layers 219, 217, 215 and onto the reflective surface 213. Reflected light 225 then travels back through layers 215, 217, 219 and onto the observer 227. Magnets, strings, clamps, springs, manual manipulation, or other devices to create fringe patterns apply force 229. The observer 227 can observe fringes on one or more sides of the object 221.

Figure 29:
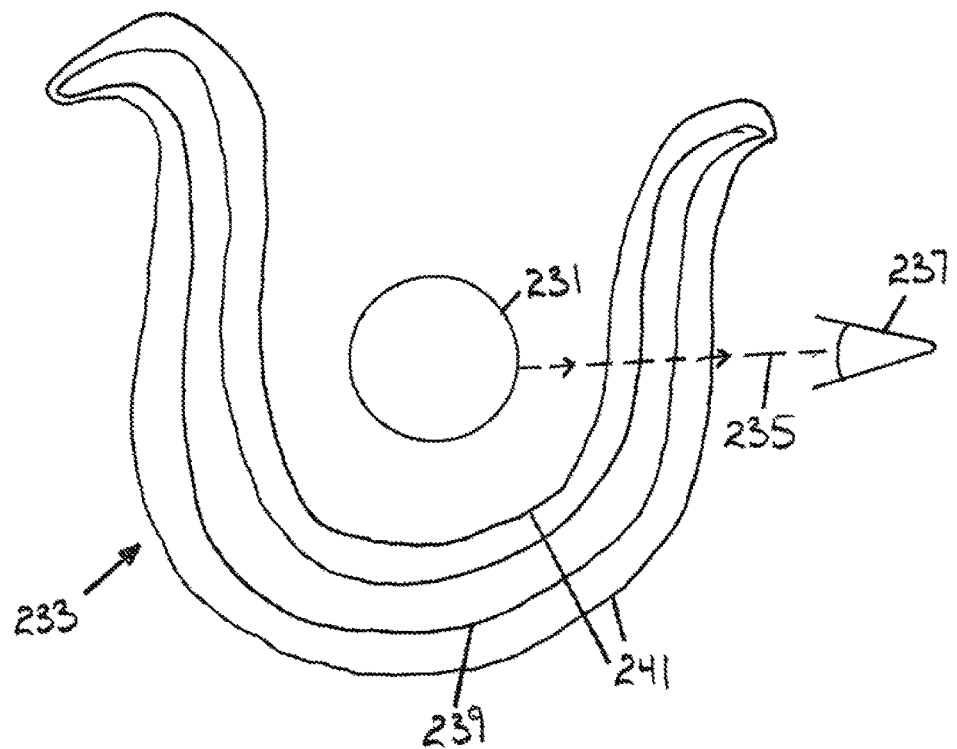
FIG. 29 is an embodiment of a candleholder or light fixture.

FIG. 29 is an embodiment of a candleholder or light fixture. A light source 231 is placed in the center of the photoelastic object 233. A light bulb may be a polarized or unpolarized light source 231. Other light sources 231 may include a candle, the sun or ambient light in related applications. Light 235 is emitted from the light source 231 and passes through the object 233 and onto the observer 237. The photoelastic object 233 is composed of a central photoelastic layer 239 covered by a polarizing film 241 on all sides. The inner layer of polarizing film 241 may be excluded if the light source 231 is polarized. The photoelastic material 239 may be of any thickness, including a painted coating. The photoelastic material 239 may be of any color, chemical composition, modulus of elasticity, or degree of transparency. Deformation may be permanently fixed into the photoelastic sheet or coating, creating permanently fixed fringes by unequal cooling or applied forces during the formative stages of photoelastic material.

Figures 30, 31, 32:
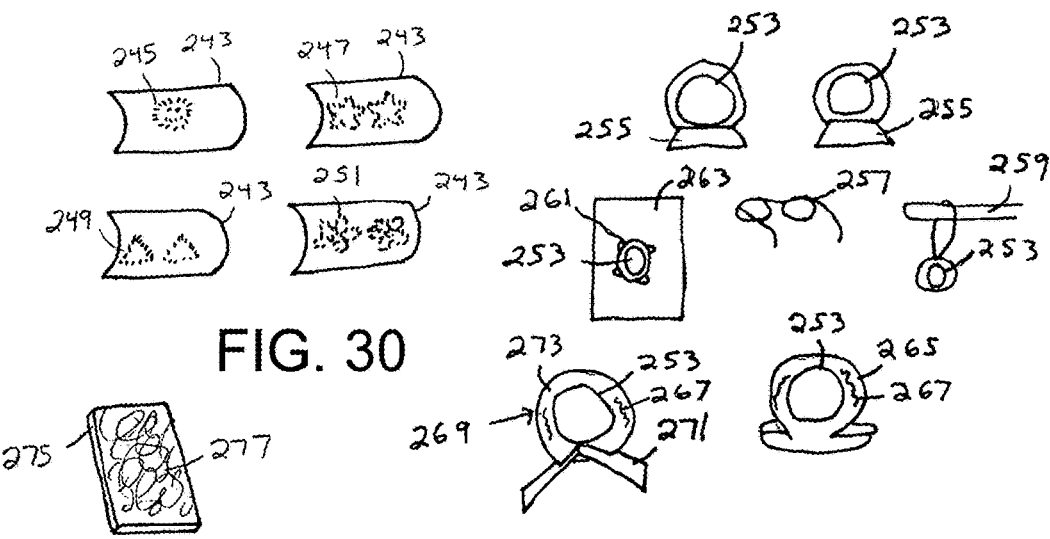
FIG. 30 shows photoelastic entertainment devices deformed to create recognizable patterns of photoelastic fringes.
FIG. 31 shows light polarizing films mounted by various means.
FIG. 32 is a shatter proof reflective surface lined with light polarizing film.

FIG. 30 shows photoelastic entertainment devices deformed to create recognizable patterns of photoelastic fringes. Photoelastic material 243 is deformed with holes or impressions to create recognizable photoelastic fringe patterns. The patterns may be faces 245, stars 247, triangles 249, or flowers 251, for example.

FIG. 31 shows light polarizing films mounted by various means. Light polarizing films 253 may be mounted on separate stands 255, which may be cardboard or plastic, and in polarizing glasses 257 and may be oriented with respect to the polarizing glasses for optimal blockage of transmitted light in viewing photoelastic objects. The films 253 may also be mounted by hanging from another object 259 or with suction cups 261 to a window 263. The films may be mounted in stands 265 that are cut from a single piece of paper or cardboard and folded so that they stand on their own. There may be fanciful designs 267 on these stands. Alternatively, a stand 269 may be a two-piece frame with a bottom folded stand part 271 and another part 273 that holds the polarizing film and is mounted in the stand part 271.

FIG. 32 is a shatter proof reflective surface 275 lined with light polarizing film 277.

Figure 33:
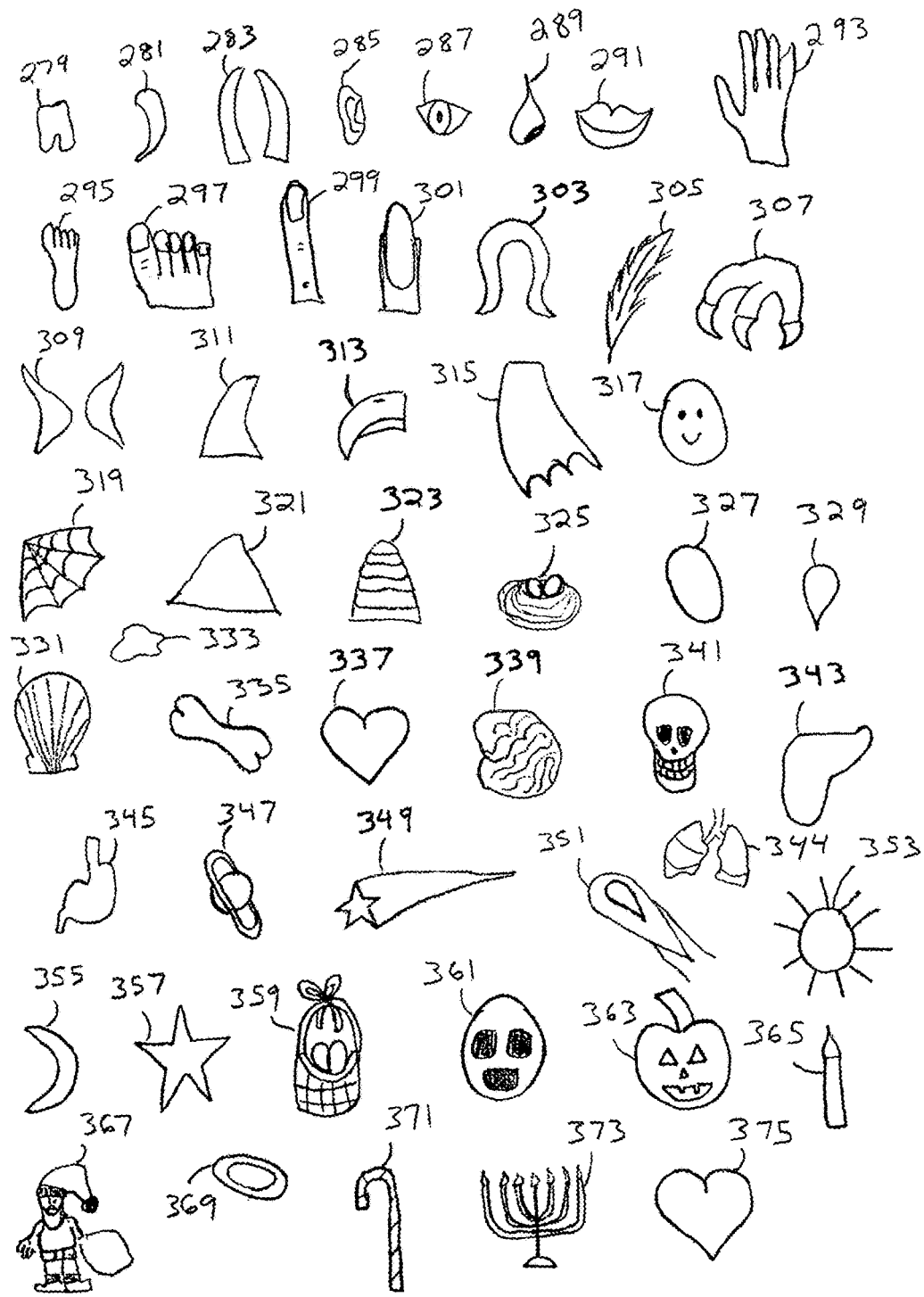
FIGS. 33-38 show shapes which the photoelastic material can be molded into.

FIGS. 33-38 show shapes which the photoelastic material can be molded into. FIG. 33 shows photoelastic material molded into the shape of teeth 279, claws 281, tusks 283, ears 285, eyes 287, noses 289, lips 291, hands 293, feet 295, toes 297, fingers 299, nails 301, hair 303, feathers 305, talons 307, wings 309, fins 311, beaks 313, flippers 315, faces 317, spider webs 319, ant hills 321, bee hives 323, birds' nests 325, eggs 327, tear drops 329, sea or snail shells 331, waste products 333, bones 335, hearts 337, brains 339, skulls 341, livers 343, lungs 344, stomachs 345, planets 347, shooting stars 349, comets 351, sun 353 or moon 355, stars 357, Easter baskets 359 or bunnies, masks 361, jackolanterns 363, candles 365, Santa Clauses 367, halos 369, candy canes 371, menorahs 373, or valentine hearts 375.

Figure 34:
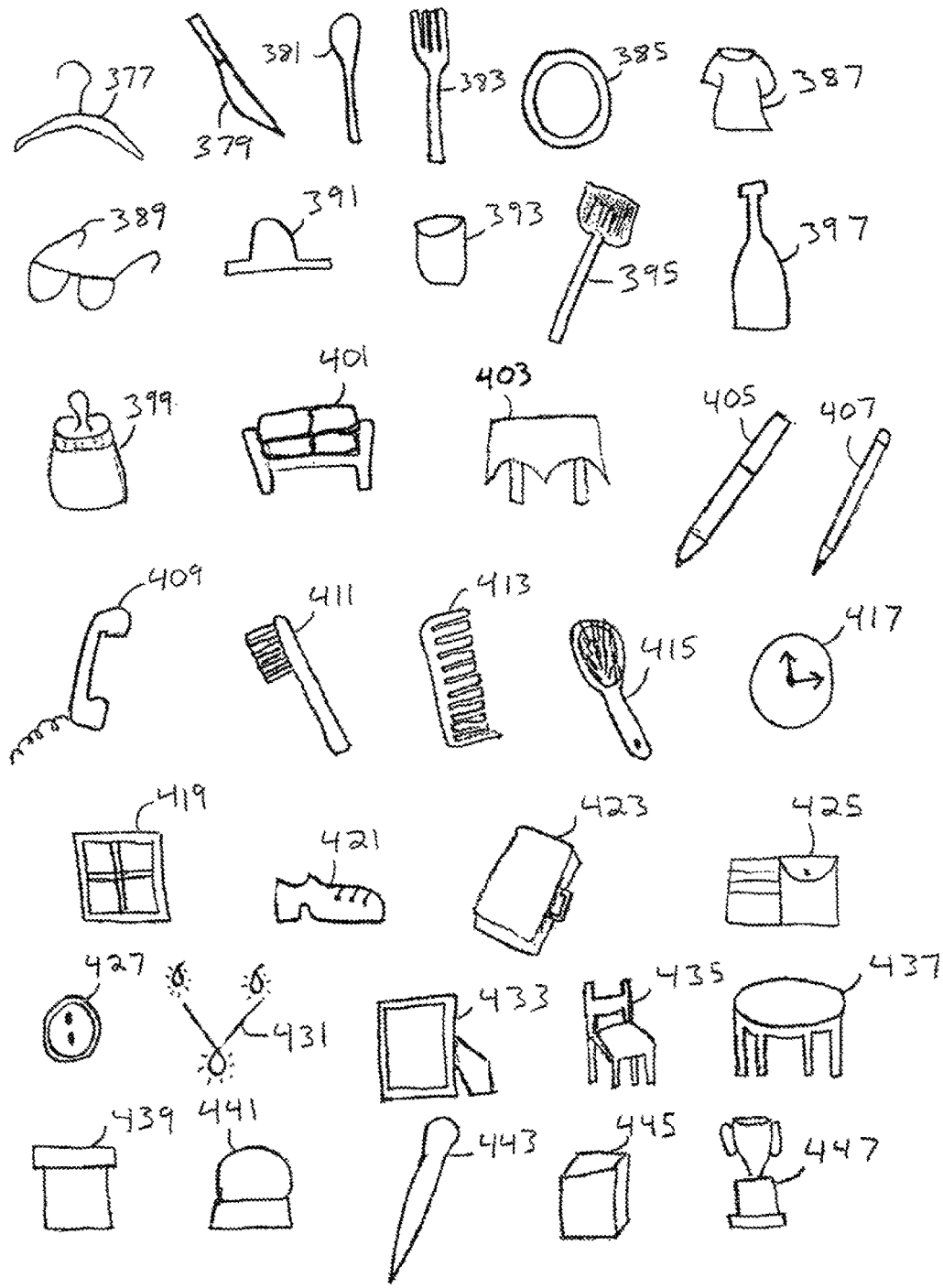

FIG. 34 shows photoelastic material molded into the shape of hangers 377, knives 379, spoons 381, forks 383, plates 385, clothes 387, glasses 389, hats 391, cups 393, brooms 395, bottles 397, baby items 399, furniture 401, table clothes 403, writing pens 405 or pencils 407, telephones 409, tooth brushes 411, combs 413, hair brushes 415, clocks 417, windows 419, shoes 421, luggage 423, wallets 425, buttons 427, jewelry 431, frames 433, chairs 435, tables 437, bar stands 439, paper weights 441, letter openers 443, boxes 445, or trophies 447.

Figure 35:
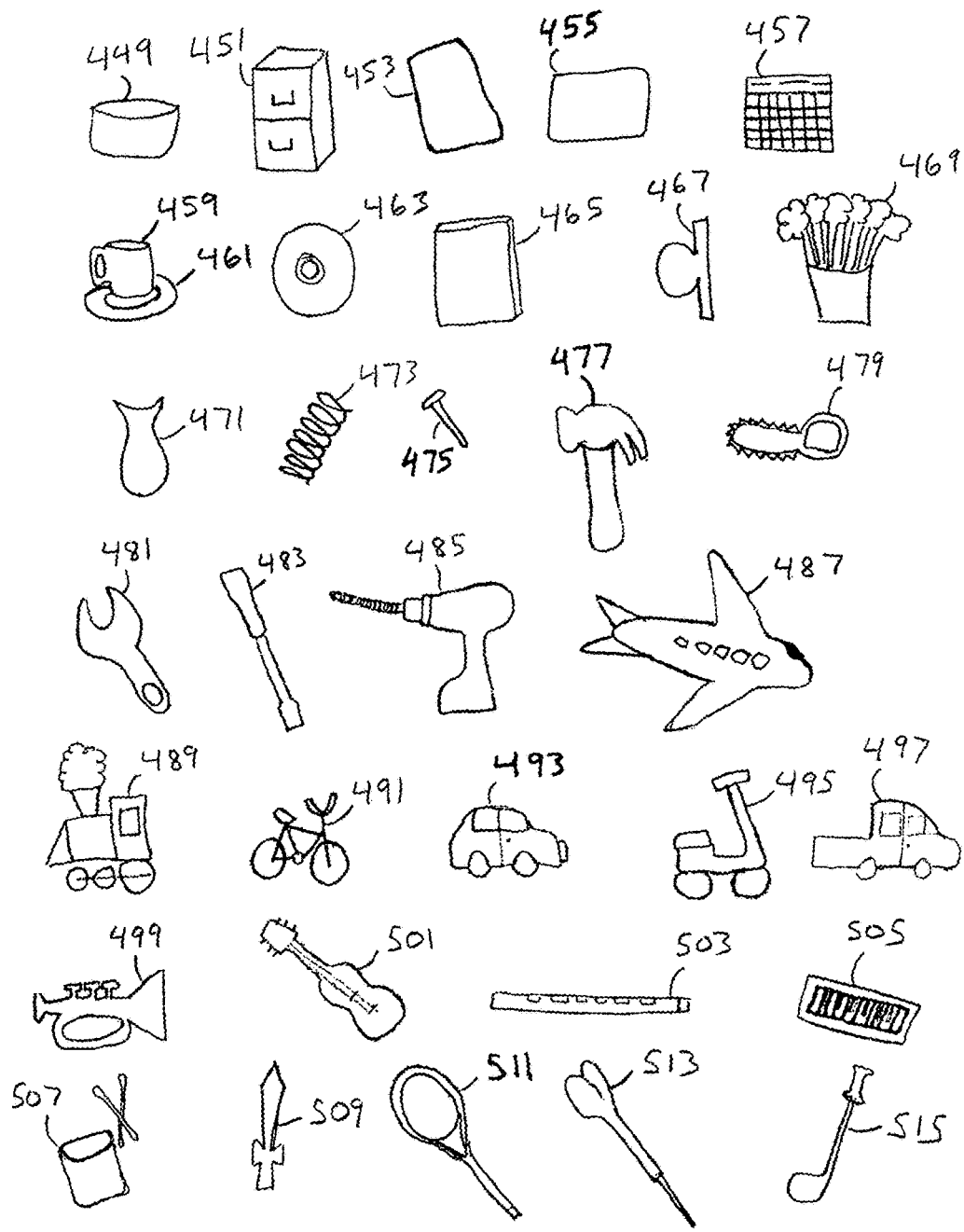

FIG. 35 shows photoelastic material molded into the shape of containers 449, storage devices 451, cloths 453, placemats 455, calendars 457, cups 459, saucers 461, CD or DVD 463, video and record covers or containers 465, knobs 467, artificial flowers 469, vases 471, springs 473, nails 475, hammers 477, saws 479, wrenches 481, screw drivers 483, drills 485, air planes 487, trains 489, bicycles 491, cars 493, scooters 495, trucks 497, horns 499, string instruments 501, flutes 503, pianos 505, drums 507, swords 509, rackets 511, darts 513, or clubs 515.

Figure 36:
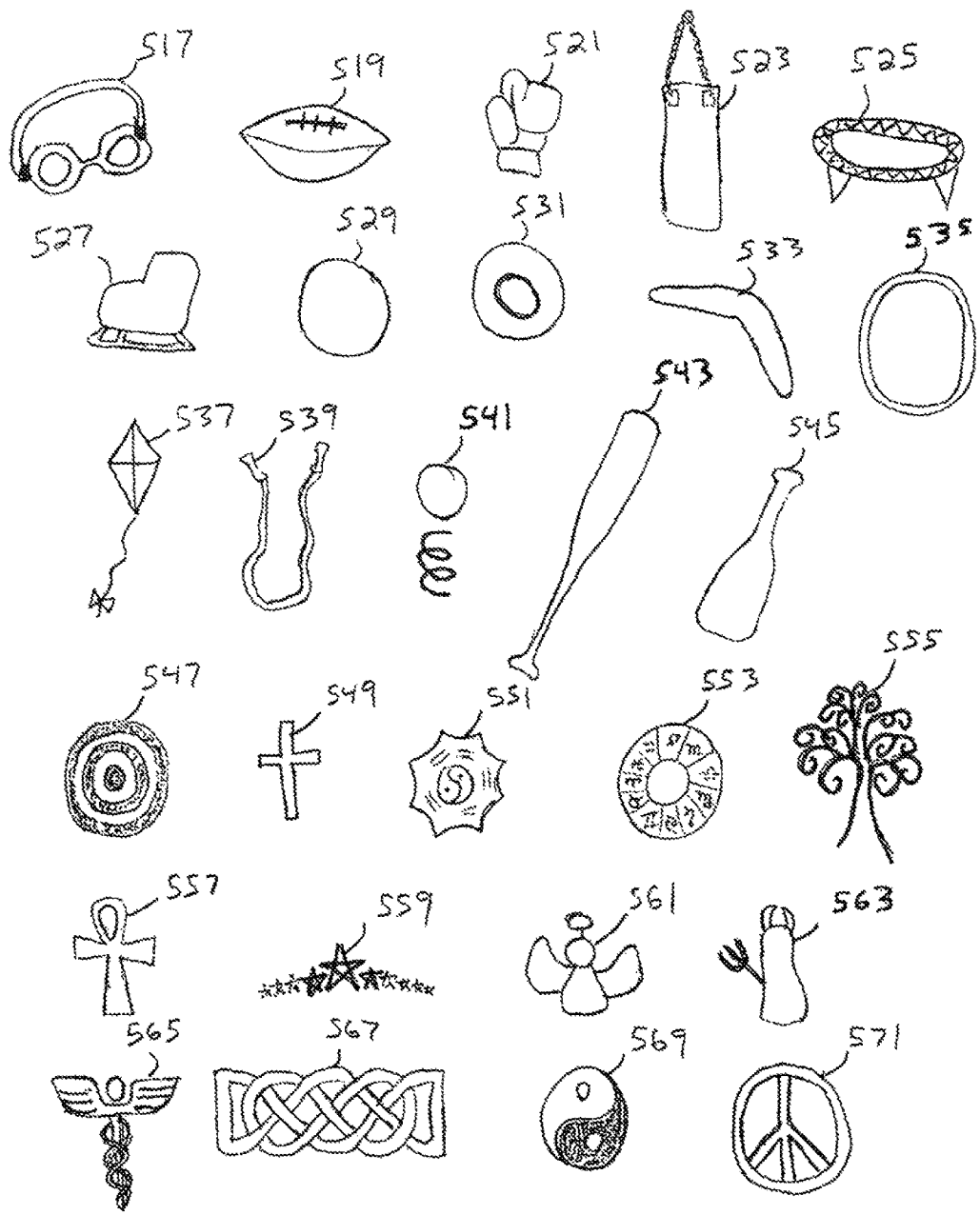

FIG. 36 shows photoelastic material molded into the shape of swimming gear 517, footballs 519, boxing glove 521 or punching bag 523 coverings, trampoline parts 525, skates 527, balls 529, discs 531, boomerangs 533, hoops 535, kites 537, jump ropes 539, bouncing objects 541, bats 543, paddles 545, targets 547, crosses 549, I-Chings 551, Zodiacs 553, Trees of life 555, Ankhs 557, Elven Stars 559, Angelic 561 and Satanic 563 symbols, Caducei 565, Celtic knots 567, yin-yangs 569, or peace signs 571.

Figure 37:
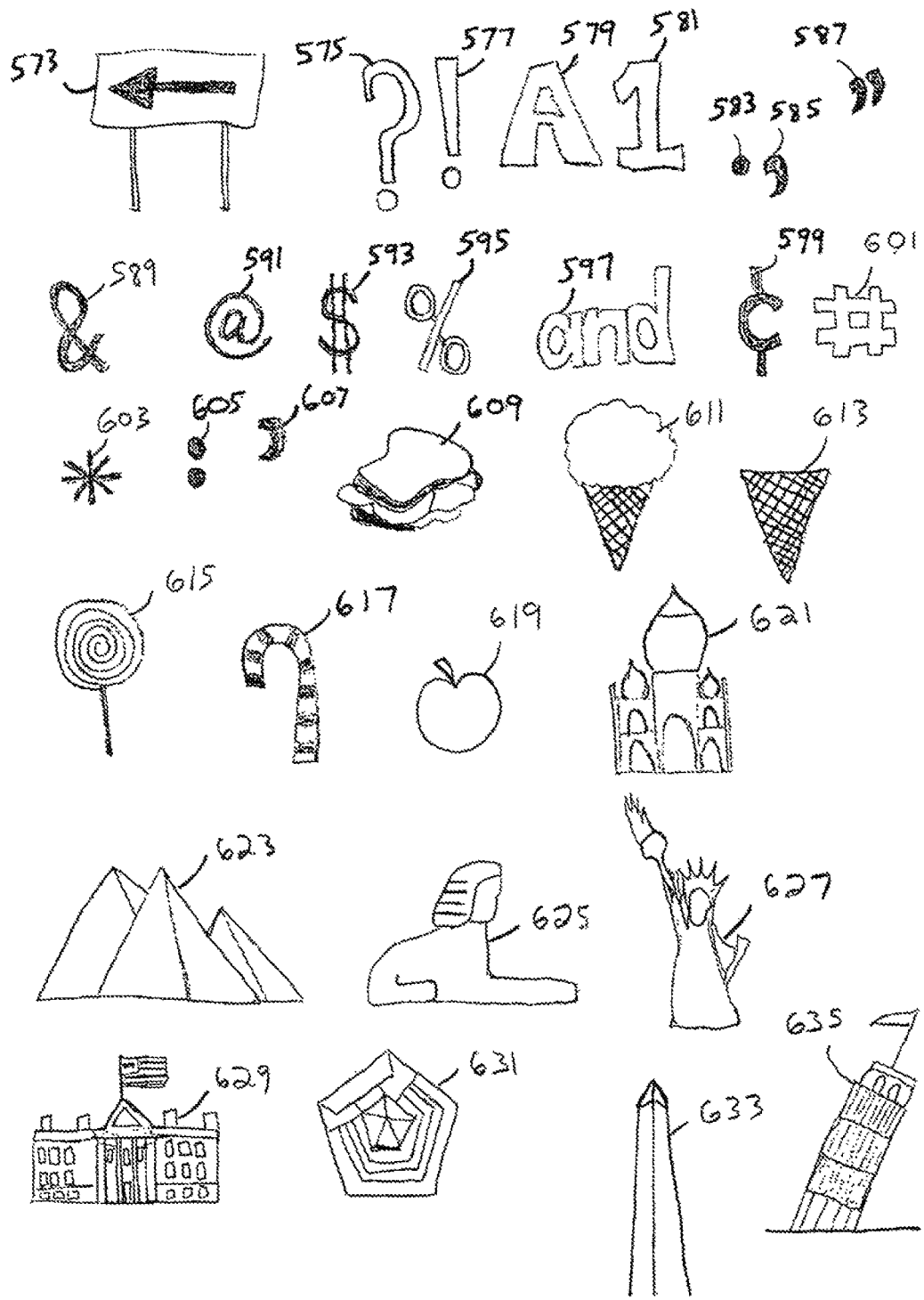

FIG. 37 shows photoelastic material molded into the shape of direction signs 573, letters 579, numbers 581, question marks 575, exclamation points 577, periods 583, quotes 587, ampersands 589, at signs 591, dollar signs 593, percent signs 595, complete words 597, number signs 601, asterisks 603, commas 585, colons 605, apostrophes 607, sandwiches 609, ice cream 611, cones 613, lollipops 615, candies 617, fruits 619, the Taj Mahal 621, Pyramids 623, the Sphinx 625, the Statue of Liberty 627, the White House 629, the Pentagon 631, the Washington Monument 633, or the Leaning Tower of Pisa 635.

Figure 38:

FIG. 38 shows photoelastic material molded into the shape of the United States Capital 637, houses 639, log cabins 641, teepees 643, igloos 645, money 647, stamps 649, flags 651, stethoscopes 653, otoscopes 655, ophthalmoscopes 656, reflex hammers 657, rainbows 659, clouds 661, snowflakes 663, fire 665, sparks 667, lightning 669, fireworks 671, or flames 673.

The purpose of the present invention is to amuse as well as to stimulate an interest in science and engineering in children and adults.

Photoelasticity can be applied to art, artifacts and toys. Examples of uses of photoelastic materials include, but are not limited to: paper weights, trophies, office and household decorations, wall fixtures, embellishment designs on clocks and telephones, designs of candle holders or light fixtures, office supplies including business cards, pens and pencils, holiday decorations, ornaments, bottles for various purposes, containers, storage devices, boxes, furniture, cloths, greeting cards, jewelry, features for decorative windows, placemats, calendars, cups, saucers, plates, utensils, letter openers, CD, DVD, video and record covers or containers, covers generally, knobs, handles, balls, discs, boomerangs, hoops, tubes, hoses, display mounts, kites, flying toys or artifacts, musical toys or artifacts, dart games, musical instruments, exercise or sports related devices, costumes, masks, swords, jump ropes, bouncing objects, balloons, other inflatable objects, switches, bats, rackets, paddles, hooks, targets, walking canes, sticks, frames for glasses, pictures or photos, umbrellas, wheels, wrapping paper and material, ribbons, bows, ties, artificial flowers and plants, vases, posters, plaques, awards, certificates, signs, book covers, pillows gardening supplies, tools, plastic coverings for electronics, i.e. laptops, mp3 players, video game consoles, toothbrushes, and computer games.

The photoelastic material may be a soft plastic, 65 or less Shore A, which exhibits a watery fluid stress color effect. When gently manipulated, the stress colors produced by such a material appear to flow like water. On such soft plastic, manipulators such as clamps or screws could be used not for hard force but only to position, using gentle force. By fixing the material in place with a screw or clamp, the user's hands are freed to manipulate the material or other objects.

Figure 39:
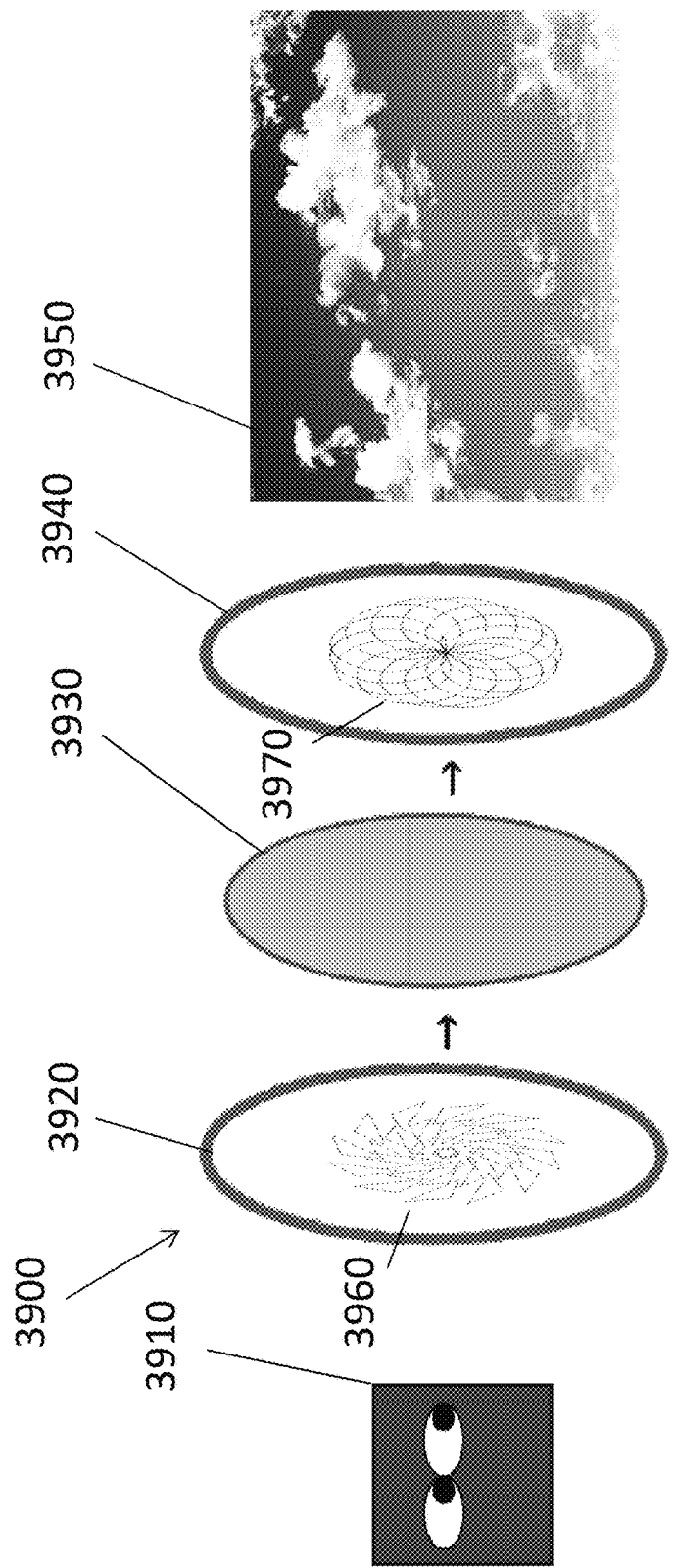
FIG. 39 shows a sky kaleidoscope system, in an embodiment.

FIGS. 39-42 shows sky kaleidoscope polariscope toys. FIG. 39 shows a sky kaleidoscope system 3900, in an embodiment. With this polariscope toy, the sky 3950 serves as a polarizer and two distinct colorful photoelastic designs 3960, 3970 sandwiching a polarizing film 3930 can be viewed alternatively. The designs are here incorporated in injection molded plastic plates 3920, 3940 and maybe 2D or 3D. Although illustrated in exploded fashion, for ease of use the plates 3920, 3940 may be removably or permanently bonded to each other with the polarizing film 3930 between them. Rainbow colors are visible when an injection molded plate 3920, 3940 is viewed between two polarizers. In the case shown, with a user 3910 holding the system 3900 up to the sky 3950, the sky 3950 acts as one of the polarizers. From this view only the rainbow colors from the second design 3970 are visible. The first design 3960 is not between two polarizers and so rainbow colors are not visible in the first design 3960 in this orientation. As the designs 3960, 3970 are here clear, the first design 3960 is essentially invisible while it does not exhibit rainbow coloration.

Figure 40:
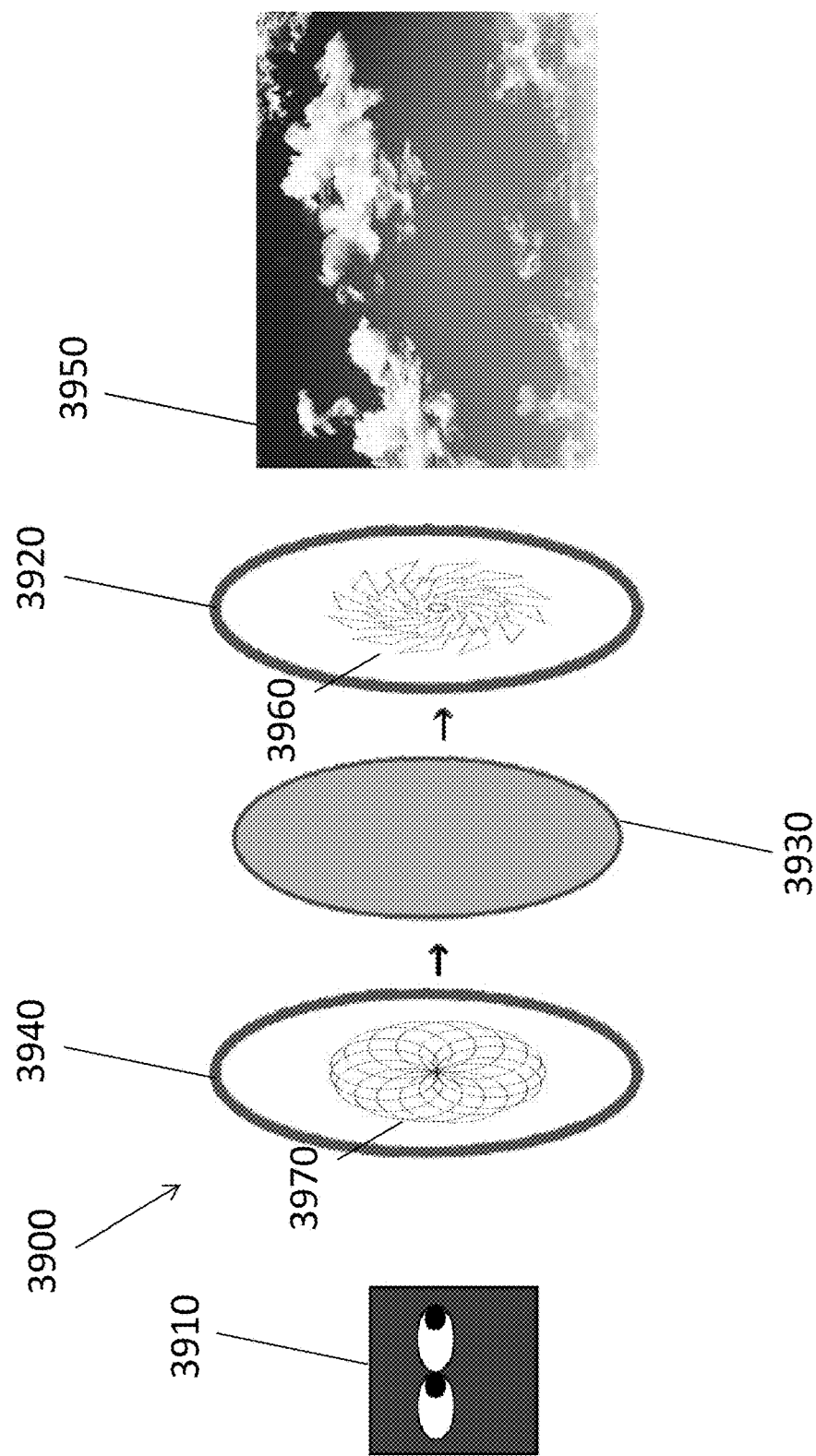
FIG. 40 shows the sky kaleidoscope system of FIG. 39 in a reverse orientation.

FIG. 40 shows the sky kaleidoscope system of FIG. 39 in a reverse orientation. When the user 3910 turns the sky kaleidoscope 3900 around so that the opposite, first design 3960 is now between the sky 3950 and the polarizing film 3930, rainbow colors are only seen from the first design 3960. Rotation of the polarizing film 3930 (for example by rotation of a plates/film sandwich) against the sky 3950 results in colors changing like a kaleidoscope. In embodiments, the film 4230 may be rotatable separately from the plates 4220, 4240, which may be desirable for example where the design is not symmetrical or it may otherwise be desirable for the design to be static while the colors change. For example, the film 4230 and plates 4220, 4240 may be connected by a pin through their middles, around which the film may rotate, for example by turning a tab or other projection protruding from the edge of the film 4230.

Figure 41:
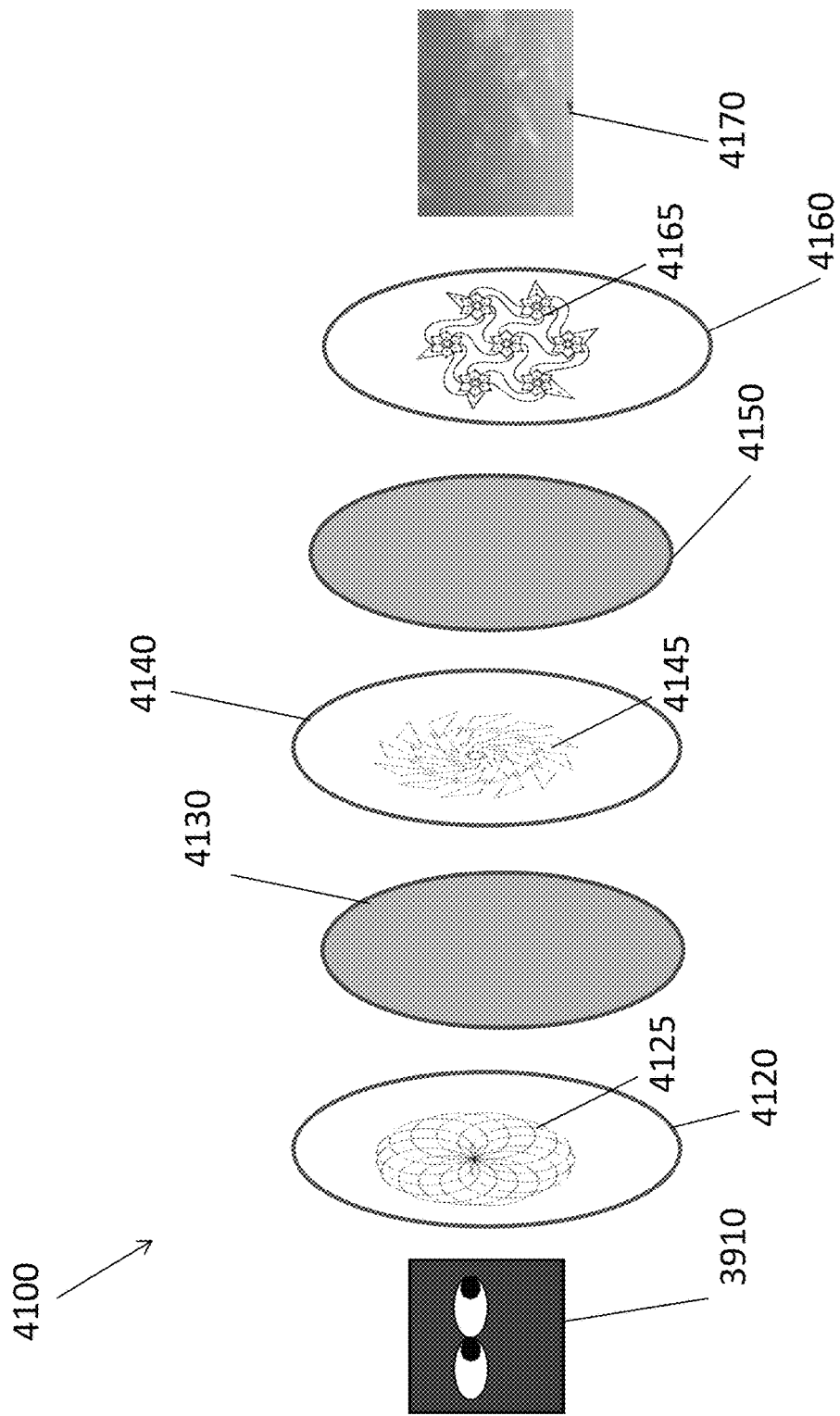
FIG. 41 shows a sky kaleidoscope system, in another embodiment.

FIG. 41 shows a sky kaleidoscope system 4100, in another embodiment. Here, an additional injection molded design 4145 is between two polarizing films 4130, 4150, all three of which are in turn between two other injection molded designs 4125, 4165, such that two designs (here 4145, 4165) overlap in a display of photoelastic colors when viewed with the polarizing effects of the sky 4170. A new colorful pattern is created by turning the device around so that the opposite plate 4120 is between the sky 4170 and the film closest to the viewer 4130. The central design 4145 may be 2D for ease of adhesion with polarizing films 4130, 4150 while outer designs 4125, 4165 may be raised. The polarizing films 4130, 4150 are oriented parallel to one another to maximize light transmission with respect to the sky 4170.

Figure 42:
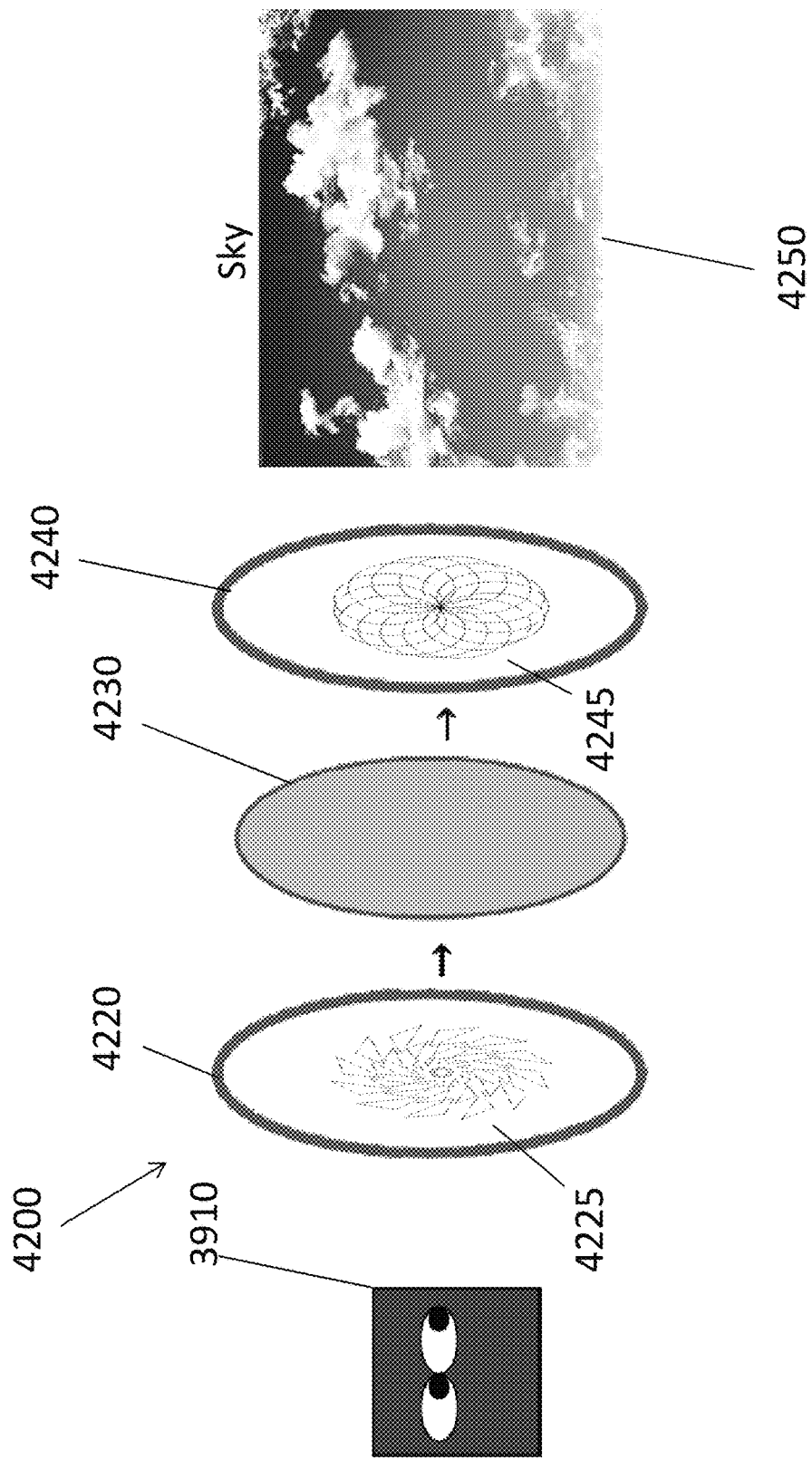
FIG. 42 shows a sky kaleidoscope system using adhesive tape, in an embodiment.

FIG. 42 shows a sky kaleidoscope system 4200 using adhesive tape, in an embodiment. Instead of injection molded plates, adhesive cellophane 4220, 4240 is applied directly to the polarizing film to create two distinct colorful designs 4225, 4245, due to the diffracting effects of the cellophane. For example, adhesive tape may be used to create the designs 4225, 5245. Alternatively, adhesive cellophane may be applied to sheets of cellophane that are attached reversibly to the film 4230, or the film 4230 may be inserted within cellophane envelopes on which the adhesive cellophane may be attached. Such embodiments allow for easy creation of new designs and swapping of designs for variety.

A kit may be provided, which allows a user to make such sky kaleidoscopes. The kit may include one or more adhesive cellophane designs, cellophane sheets, cellophane envelopes, stress free transparent plastic plates, and/or polarizing films, as well as directions. Because the plates are stress-free, they will not exhibit birefringence when sandwiched between polarizing films, and thus will not interfere with the patterns of the cellophane or other photoelastic/diffracting designs. The cellophane envelopes may cover the polarizing films and protect them during use. Nonadhesive cellophane sheets may be provided for use as canvases for cut outs from adhesive cellophane sheets. The cellophane canvases with the designs may be attached to the polarizing film with removable clips and/or other fasteners, allowing reuse of the film and saving of the designs. In this way, designs may be easily saved and interchanged.

While the invention has been described with reference to specific embodiments, modifications and variations of the invention may be constructed without departing from the scope of the invention.

I claim:

1. A sky kaleidoscope system, comprising
a polarizing film;
a first plastic plate having a first transparent design; and
a second plastic plate having a second transparent design;

wherein the polarizing film is sandwiched between the first plastic plate and the second plastic plate;

wherein the first and second transparent designs are photoelastic.

2. The system of claim 1, wherein at least one of the first transparent design and the second transparent design is formed with layered adhesive cellophane.

3. The system of claim 1, wherein at least one of the first plastic plate and the second plastic plate is injection-molded, with the corresponding design formed during injection molding.

4. The system of claim 1, wherein at least one of the first transparent design and the second transparent design is three-dimensional and extends above a surface of the plate the design is on.

5. The system of claim 1, further comprising a third plastic plate having a third transparent design and a second polarizing film, wherein the second polarizing film is sandwiched between the second plastic plate and the third plastic plate.

6. The system of claim 1, further comprising a mechanism configured to rotate the polarizing film separately from the plastic plates.

7. The system of claim 1, wherein the polarizing films and plastic plates are permanently bonded.

8. The system of claim 1, wherein the polarizing films and plastic plates are removably attached.

9. The system of claim 1, wherein the polarizing film completely covers the first and second designs.

10. The system of claim 1, wherein the first and second plastic plates comprise sheets of cellophane and the first and second designs comprise adhesive cellophane attached to the first and second plastic plates.

11. A sky kaleidoscope system, comprising
a polarizing film;
a first plastic plate having a first transparent design; and
a second plastic plate having a second transparent design;
wherein the polarizing film is sandwiched between the first plastic plate and the second plastic plate;
wherein the first and second transparent designs are at least one of photoelastic and light diffracting;
wherein the first and second plastic plates comprise two sides of a cellophane envelope and the first and second designs are adhered to and/or part of the sides of the cellophane envelope.

12. A method of using the system of claim 1, comprising holding the system up to the sky and looking through the plastic plates and polarizing film to view resulting rainbow colors in the first or second transparent design.

13. The method of claim 12, further comprising rotating the polarizing film.

14. The method of claim 12, further comprising flipping the system over, holding up the flipped system to the sky and looking through the plastic plates and polarizing film.

15. The method of claim 12, further comprising removing the first or second plastic plate and replacing it with another plastic plate.

16. The method of claim 15, further comprising placing adhesive tape on the another plastic plate to form another transparent design.

17. A sky kaleidoscope method, comprising:
holding a sky kaleidoscope system up to the sky, the sky kaleidoscope system comprising:
a polarizing film;
a first plastic plate having a first transparent design; and
a second plastic plate having a second transparent design;
wherein the polarizing film is sandwiched between the first plastic plate and the second plastic plate;
wherein the first and second transparent designs are at least one of photoelastic and light diffracting;
looking through the plastic plates and polarizing film to view resulting rainbow colors in the first or second transparent design; and
removing the polarizing film from the first and second plastic plates and placing it in a cellophane envelope having other transparent designs on first and second sides holding the system up to the sky and looking through the cellophane envelope and polarizing film to view resulting rainbow colors in the other transparent designs.

18. A sky kaleidoscope system, comprising
a polarizing film;
a first structure having a first transparent design positioned on a first side of the polarizing film; and
a second structure having a second transparent design positioned on a second side of the polarizing film;
wherein the polarizing film is sandwiched between the first transparent design structure and the second transparent design structure;
wherein the first and second transparent designs are at least one of photoelastic and light diffracting; and
wherein the first and second transparent designs are asymmetric and non-periodic.

19. The system of claim 1, wherein at least one of the first and second transparent designs has no perceptible effect on visible light when physically located between the polarizing film and a user.

20. The system of claim 18, wherein at least one of the first and second transparent designs has no perceptible effect on visible light when physically located between the polarizing film and a user.

21. The system of claim 1, wherein the first and second transparent designs are flat.

22. The system of claim 1, wherein at least one of the first and second transparent designs comprises strain patterns within the respective first and second plastic plates, resulting in at least one pattern of rainbow colors.

23. The system of claim 11, wherein at least one of the first and second transparent designs comprises strain patterns within the respective first and second plastic plates, resulting in at least one pattern of rainbow colors.

24. The system of claim 17, wherein at least one of the first and second transparent designs comprises strain patterns within the respective first and second plastic plates, resulting in at least one pattern of rainbow colors.

25. The system of claim 18, wherein at least one of the first and second transparent designs comprises strain patterns within the respective first and second structures, resulting in at least one pattern of rainbow colors.

* * * * *